(12) United States Patent
Preindl et al.

(10) Patent No.: US 12,620,903 B2
(45) Date of Patent: May 5, 2026

(54) SYSTEMS AND METHODS FOR STACKED MULTI-LEVEL POWER CONVERTER IMPLEMENTATIONS WITH LINEAR SCALING

(71) Applicant: The Trustees of Columbia University in the City of New York, New York, NY (US)

(72) Inventors: Matthias Preindl, New York, NY (US); Matthew Jahnes, Upper Saddle River, NJ (US)

(73) Assignee: The Trustees of Columbia University in the City of New York, New York, NY (US)

( * ) Notice: Subject to any disclaimer, the term of this patent is extended or adjusted under 35 U.S.C. 154(b) by 240 days.

(21) Appl. No.: 18/241,048

(22) Filed: Aug. 31, 2023

(65) Prior Publication Data

US 2023/0412087 A1       Dec. 21, 2023

Related U.S. Application Data

(63) Continuation of application No. PCT/US2022/018940, filed on Mar. 4, 2022.
(Continued)

(51) Int. Cl.
*H02M 3/07* (2006.01)
*H02M 1/00* (2006.01)
(Continued)

(52) U.S. Cl.
CPC ..... *H02M 3/33584* (2013.01); *H02M 1/0095* (2021.05); *H02M 3/1582* (2013.01);
(Continued)

(58) Field of Classification Search
CPC ................................. H02M 3/07; H02M 3/073
See application file for complete search history.

(56) References Cited

U.S. PATENT DOCUMENTS 3,940,680 A    2/1976  Tadokoro et al.
5,027,264 A    6/1991  DeDoncker et al.
(Continued)

OTHER PUBLICATIONS

PCT International Search Report and Written Opinion, International Application No. PCT/US2022/018940, mailed Jun. 8, 2022 (13 pages).

(Continued)

*Primary Examiner* — Gary A Nash
(74) *Attorney, Agent, or Firm* — Potomac Law Group, PLLC

(57)                ABSTRACT

Disclosed are methods, systems, devices, and other implementations, including a voltage converter system that includes a plurality of energy storage elements, a plurality of switching devices, each of which is in electrical communication with at least one of the plurality of the storage elements, with the plurality of storage elements and the plurality of switching devices being configured in a multi-level arrangement of multiple voltage converting cells. The system further includes a plurality of controllers to actuate one or more of the plurality of switching devices to independently control voltage levels of at least one energy storage element of the multiple voltage converting cells. In some embodiments, the cells may include an arrangement of two capacitors and an inductor that define a buck-boost converter circuit. Alternatively, the cells may have a Dual Active Half Bridge (DAHB) converter configuration with a primary side separated from a secondary side by a transformer.

35 Claims, 25 Drawing Sheets

Related U.S. Application Data

(60) Provisional application No. 63/157,075, filed on Mar. 5, 2021.

(51) Int. Cl.
| | | |
|---|---|---|
| *H02M 3/158* | (2006.01) | |
| *H02M 3/335* | (2006.01) | |
| *H02M 7/483* | (2007.01) | |
| *H02P 27/14* | (2006.01) | |

(52) U.S. Cl.
CPC .......... *H02M 7/4835* (2021.05); *H02P 27/14* (2013.01); *H02M 3/07* (2013.01); *H02M 3/073* (2013.01)

(56) References Cited

U.S. PATENT DOCUMENTS

| | | | | |
|---|---|---|---|---|
| 5,581,454 | A * | 12/1996 | Collins | H02M 3/07 363/59 |
| 6,040,990 | A | 3/2000 | Courault | |
| 7,907,429 | B2 * | 3/2011 | Ramadass | H02M 3/07 363/59 |
| 8,692,408 | B2 | 4/2014 | Zhang et al. | |
| 9,083,230 | B2 | 7/2015 | Narimani et al. | |
| 9,142,956 | B2 | 9/2015 | Yatsu | |
| 9,160,232 | B2 | 10/2015 | Thomas et al. | |
| 9,325,252 | B2 | 4/2016 | Narimani et al. | |
| 9,559,611 | B2 | 1/2017 | Zhang et al. | |
| 9,917,515 | B2 * | 3/2018 | Lemmen | H02M 3/158 |
| 10,270,368 | B2 * | 4/2019 | Sampayan | H02J 3/381 |
| 2005/0084745 | A1 | 4/2005 | Colello et al. | |
| 2005/0213267 | A1 * | 9/2005 | Azrai | H02M 3/07 361/15 |
| 2009/0085546 | A1 | 4/2009 | Phadke et al. | |
| 2010/0039080 | A1 | 2/2010 | Schoenbauer et al. | |
| 2014/0184189 | A1 | 7/2014 | Salem | |
| 2014/0293667 | A1 | 10/2014 | Schroeder et al. | |
| 2015/0171768 | A1 * | 6/2015 | Perreault | H02M 7/537 330/251 |
| 2017/0054294 | A1 | 2/2017 | Lyu et al. | |
| 2018/0026518 | A1 | 1/2018 | Liu et al. | |
| 2020/0028445 | A1 | 1/2020 | Norambuena Valdivia et al. | |
| 2021/0044216 | A1 | 2/2021 | Riar et al. | |

OTHER PUBLICATIONS

Abdel-Moamen et al., "France-Spain HVDC transmission system with hybrid modular multilevel converter and alternate-arm converter," Innovations in Power and Advanced Computing Technologies, Apr. 2017.

Alhuwaishel et al., "A New Medium Voltage DC Collection Grid for Large Scale PV Power Plants with SiC Devices," IEEE 19th Workshop on Control and Modeling for Power Electronics, Jun. 2018.

Allebrod et al., "New transformerless, scalable Modular Multilevel Converters for HVDC-transmission," 2008 IEEE Power Electronics Specialists Conference, Jun. 2008.

Allehyani et al., "A New Modular Micro-inverter with Sinusoidal Output Voltage Using GaN Switches for PV Modules," 9th IEEE International Symposium on Power Electronics for Distributed Generation Systems, Jun. 2018.

Alonso et al., "An overall study of a Dual Active Bridge for bidirectional DC/DC conversion," 2010 IEEE Energy Conversion Congress and Exposition, Sep. 2010.

Alves et al., "Review on SiC-MOSFET Devices and Associated Gate Drivers," IEEE International Conference on Industrial Technology, Feb. 2018.

Beniwal et al., "Enhancing the Natural Voltage Balancing Capability of Neutral-Point-Clamped Converters under Carrier-Based Pulsewidth Modulation," IEEE 4th Southern Power Electronics Conference, Dec. 2018.

Chang et al., "Improving the Overall Efficiency of Automotive Inverters Using a Multilevel Converter Composed of Low Voltage Si mosfets," IEEE Transactions on Power Electronics, vol. 34, Issue 4, pp. 3586-3602, Apr. 2019.

Du et al., "Review of high power isolated bi-directional DC-DC converters for PHEV/EV DC charging infrastructure," IEEE ECCE, pp. 553-560, Sep. 2011.

Filsoof et al., "Design and control of a bidirectional triangular modular multilevel DC-DC converter," IEEE 14th Workshop on Control and Modeling for Power Electronics, Oct. 2013.

Gao et al., "Duty-cycle plus phase-shift control for a dual active half bridge based bipolar DC microgrid," IEEE Applied Power Electronics Conference and Exposition, Mar. 2018.

Gauthier et al., "Transformer-less five-level diode-clamped converter based active power filter with auxiliary balancing circuit," CCECE, May 2010.

He et al., "Design of 1 KW bidirectional half-bridge CLLC converter for electric vehicle charging systems," IEEE International Conference on Power Electronics, Drives and Energy Systems, Dec. 2016.

Jahnes et al., "A Balanced and Vertically Stacked Multilevel Power Converter Topology with Linear Component Scaling," 47th Annual Conference of the IEEE Industrial Electronics Society, Oct. 2021.

Josefsson et al., "Evaluation and comparison of a two-level and a multilevel inverter for an EV using a modulized battery topology," 38th Annual Conference on IEEE Industrial Electronics Society, Oct. 2012.

Kasper et al., "Novel High Voltage Conversion Ratio "Rainstick" DC/DC Converters," Proceedings of the IEEE Energy Conversion Congress and Exposition, pp. 789-796, Sep. 2013.

Khomfoi et al., "Multilevel Power Converters," Power Electronics Handbook, Third Edition, Chapter 17, pp. 455-486, 2011.

Kumar et al., "A Hybrid Multilevel and Multi-Pulse Power Converters Based Adjustable Speed Drive," 2023 IEEE Energy Conversion Congress and Exposition (ECCE), Oct. 2023.

Lai et al., "Multilevel converters-a new breed of power converters," IEEE Transactions on Industry Applications, vol. 32, Issue 3, pp. 509-517, Jun. 1996.

Lang et al., "A Dual-Channel Enhanced Power Generation Architecture with Back-to-back Converter for MEA Application," 2019 IEEE International Electric Machines & Drives Conference (IEMDC), May 2019.

Li et al., "A natural ZVS medium-power bidirectional DC-DC converter with minimum number of devices," IEEE Transactions on Industry Applications, vol. 39, No. 2, pp. 525-535, Mar. 2003.

Morsy et al., "A new high power density modular multilevel DC-DC converter with localized voltage balancing control for arbitrary No. of levels," IEEE Applied Power Electronics Conference and Exposition, May 2016.

Nami et al., "Modular Multilevel Converters for HVDC Applications: Review on Converter Cells and Functionalities," IEEE Transactions on Power Electronics, vol. 30, No. 1, pp. 18-36, Jan. 2015.

Narendrababu et al., "A Five Level Diode Clamped Rectifier with Novel Capacitor Voltage Balancing Scheme," IEEE International Conference on Power Electronics, Drives and Energy Systems, Dec. 2014.

Ngo et al., "A single-phase bidirectional dual active half-bridge converter," 27th Annual IEEE Applied Power Electronics Conference and Exposition, Feb. 2012.

Peng, "A generalized multilevel inverter topology with self voltage balancing," IEEE Transactions on Industry Applications, vol. 37, Issue 2, pp. 611-618, Mar.-Apr. 2001.

Pires et al., "A Statcom Based on a Three-Phase, Triple Inverter Modular Topology for Multilevel Operation," IEEE Transactions on Power Delivery, vol. 34, Issue 5, pp. 1988-1997, Oct. 2019.

Shi et al., "A Unified State-Space Modeling Method for a Phase-Shift Controlled Bidirectional Dual-Active Half-Bridge Converter," IEEE Transactions on Power Electronics, vol. 35, Issue 3, pp. 3254-3265, Jul. 2019.

Shi et al., "Modeling and Decoupled Control of a Buck-Boost and Stacked Dual Half-Bridge Integrated Bidirectional DC-DC Converter," IEEE Transactions on Power Electronics, vol. 33, Issue 4, pp. 3534-3551, Apr. 2018.

(56)  References Cited

OTHER PUBLICATIONS

Tibola et al., "Floating high step-down stacked dc-dc converter based on buck-boost cells," 17th European Conference on Power Electronics and Applications, Sep. 2015.

Tolbert et al., "Multilevel converters for large electric drives," IEEE Transactions on Industry Applications, vol. 35, Issue 1, pp. 36-44, Jan./Feb. 1999.

Tong et al., "On the Techniques to Utilize SiC Power Devices in High- and Very High-Frequency Power Converters," IEEE Transactions on Power Electronics, vol. 34, Issue 12, pp. 12181-12192, Mar. 2019.

Wang et al., "Extended ZVS Modulation for a Dual Cell Link in the Demand of Faster Balancing," IEEE/SICE International Symposium on System Integration, Jan. 2019.

Wang et al., "Maximum-Power-Per-Ampere Variable Frequency Modulation for Dual Active Bridge Converters in Battery-Balancing Application," IEEE Transactions on Industrial Electronics, vol. 69, Issue 6, pp. 5900-5910, Jun. 2022.

Yang et al., "An Enhanced Closed-Loop Control Strategy With Capacitor Voltage Elevation for the DC-DC Modular Multilevel Converter," IEEE Transactions on Industrial Electronics, vol. 66, Issue 3, pp. 2366-2375, Mar. 2019.

Yuang et al., "Self-balancing of the clamping-capacitor-voltages in the multilevel capacitor-clamping-inverter under sub-harmonic PWM modulation," IEEE Transactions on Power Electronics, vol. 16, Issue 2, pp. 256-263, Mar. 2001.

Zhang et al., "Research of control strategies of MMC based on full bridge sub-modules," The Journal of Engineering, vol. 2019, Issue 16, pp. 2120-2124, 2018.

Zhang et al., "Study of the multilevel converters in DC-DC applications," 2004 IEEE 35th Annual Power Electronics Specialists Conference, Jun. 2004.

* cited by examiner

300

BEGIN

2200

Obtaining electrical properties data representative of electrical properties of a voltage converter system comprising a plurality of energy storage elements and a plurality of switching devices, with each of the plurality of switching devices being in electrical communication with at least one of the plurality of the energy storage elements, with the plurality of energy storage elements and the plurality of switching devices being configured in a multi-level arrangement of multiple voltage converting cells.

2210

Controllably actuating by a plurality of controllers coupled to the multiple voltage converting cells, based at least in part on the electrical properties data, one or more of the plurality of the switching devices to independently control voltage levels of at least one energy storage element of the multiple voltage converting cells.

2220

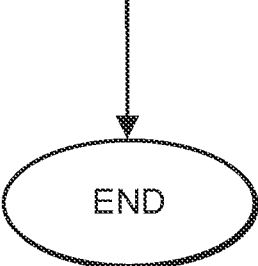

END

FIG. 22

SYSTEMS AND METHODS FOR STACKED MULTI-LEVEL POWER CONVERTER IMPLEMENTATIONS WITH LINEAR SCALING

CROSS-REFERENCE TO RELATED APPLICATIONS

This application is a continuation of International Application No. PCT/US2022/018940, filed Mar. 4, 2022, entitled "Systems and Methods for Stacked Multi-Level Power Converter Implementations with Linear Scaling," which claims the benefit of, and priority to, U.S. Provisional Application No. 63/157,075, entitled "A Fully Balanced Vertically Stacked Multilevel Power Converter Topology with Linear Scaling," filed Mar. 5, 2021, the contents of which is incorporated herein by reference in their entireties.

STATEMENT REGARDING FEDERALLY SPONSORED RESEARCH

This invention was made with government support under Grant No. 1653574 awarded by the National Science Foundation (NSF). The government has certain rights in the invention.

BACKGROUND

Multi-level power converters serve to bridge the gap between high-voltage systems and lower voltage components. The potential applications of multilevel power conversion are wide, ranging from high-voltage DC transmission (HVDC), to medical devices, and to automotive technology. HVDC transmission systems achieve notable efficiency when controlled through multilevel topologies over traditional 2-level topologies. Electric vehicles, an inevitable future, also stand to benefit from the use of multilevel topologies.

Multilevel power converters have favorable advantages when compared to single-level power converters. For example, they can operate with higher voltages than individual converters and can also output higher quality waveform signals. Further, by distributing the full voltage across multiple discrete levels, a higher quality output waveform is achieved when switching between multiple discrete levels as opposed to a topology that has only one switched level.

Multi-level converters, however, often have complicated circuit topologies and can have unstable voltage balancing (which refers to the ability of the circuit to maintain a constant desired voltage between levels or across capacitors) across their circuit components. Full-bridge modular multi-level converters (MMC) have improved implementation over half-bridge MMC with respect to flexibility in capacitor voltages and balancing, but come at the cost of increased switching devices and control complexity. Likewise, the diode-clamped, capacitor clamped, and general D-shaped topologies also require extra attention to keep capacitor voltages balanced, more so as the number of levels increases.

Addressing these two common issues can greatly advance the integration of multilevel power converters into high power technologies, such as electric vehicle charging and electric grids.

SUMMARY

The present disclosure is directed to a simple and a highly efficient multi-level configurations of stackable voltage conversion. The stackable cells of the approaches described herein can be easily connected together with linear scaling and can also be individually controlled, lending the proposed topologies to a modular and readily expandable approach. The voltage conversion configurations of the present approaches provide a bidirectional and AC/DC or DC/DC capabilities that can be used for a variety of applications, ranging from electric vehicles to HVDC transmission. The ability to simultaneously sink or source current at any node along the center stack of energy storage elements (capacitors) can be beneficial for local power distribution systems. Also described herein are physical circuits implementations for the proposed topologies, procedures and techniques to control operation of the circuitry (e.g., through control of the duty cycles), and evaluation of the performance of the proposed topologies.

The proposed implementations and topologies have marked benefits over existing multilevel power converter topologies, with their simplicity at the forefront. Stackable cells can be easily connected together with linear scaling and can also be individually controlled, lending the proposed topologies to a modular and readily expandable approach.

The proposed topologies mitigate the various deficiencies of traditional multi-level converters through independently operable and stackable unit switching cells that can bidirectionally convert AC/DC or DC/DC while sustaining capacitor voltage balance. Neither the complexity of control nor circuit design of this topology increases with the number of levels. Component quantities scale linearly with number of levels.

The proposed topologies described herein also include an arrangement of discrete, identical, and individually controlled switching cells that are dual active half bridges with three degrees of freedom (3D-DAHB). In the DAHB voltage converter configuration, the individual cells can move power between any of the connected capacitors. The proposed DAHB topology operates by balancing the voltage of all connected capacitors.

Advantages of the topologies described herein is the reduced overhead (e.g., in terms of number of components) required to implement the proposed topologies relative to conventional topologies. Component quantities as a function of n levels (number of voltage levels) for a variety of multilevel converters and for the two example proposed Manhattan topologies described herein are provided in Table 1 below. Diode-clamped, capacitor-clamped, and the generalized D-shaped converters have exponentially increasing component counts as a function of number of levels. Modular Multilevel converters (MMC) have unbalanced voltages in steady state, making DC/DC implementations of these topologies challenging. The full-bridge MMC improves over the half-bridge MMC with respect to flexibility in capacitor voltages and balancing but comes at the cost of increased switching devices and control complexity. Likewise, the diode clamped, capacitor clamped, and generalized D-shaped topologies also require extra attention to keep capacitor voltages balanced, more so as the number of levels increases.

On the other hand, the two example topologies described herein (half-bridge Manhattan topology and the dual active half bridge Manhattan topology) require approximately half the number of switches and inductive components as conventional voltage converters. In addition, the DAHB Manhattan converter mitigates the problem of loop currents. The proposed implementations therefore offer a fully balanced power electronic topology that scales linearly to n levels with constant component size.

TABLE 1

| Number of Components in n-Level Converter Topologies | | | |
|---|---|---|---|
| Topology | Semiconductors | Inductors/ Transformers | Capacitors |
| Diode-Clamped | $n^2 - n$ | 1 | $n - 1$ |
| Capacitor-Clamped | $2(n - 1)$ | 1 | $(n - 1) + \dfrac{n^2 - 3n + 2}{2}$ |
| Generalized D-shaped | $n(n - 1)$ | 1 | $\dfrac{n^2 + n}{2} - n$ |
| Half-Bridge MMC | $4(n - 1)$ | 2 or $4(n - 1)$ | $2(n - 1)$ |
| Full-Bridge MMC | $8(n - 1)$ | 2 or $4(n - 1)$ | $2(n - 1)$ |
| Half-Bridge Manhattan | $2(n - 1)$ | $n - 1$ | n |
| Dual-Active Half-Bridge Manhattan | n | $n/2$ | n |

Thus, in some variations, a voltage converter system is provided that includes a plurality of energy storage elements, and a plurality of switching devices, each in electrical communication with at least one of the plurality of the energy storage elements, with the plurality of energy storage elements and the plurality of switching devices being configured in a multi-level arrangement of multiple voltage converting cells. The system further includes a plurality of controllers to controllably actuate one or more of the plurality of switching devices to independently control voltage levels of at least one energy storage element of the multiple voltage converting cells.

Embodiments of the system may include at least some of the features described in the present disclosure, including one or more of the following features.

Each of the multiple voltage converting cells may include an arrangement of two capacitors and an inductor that define a buck-boost converter circuit.

The multiple voltage converting cells may be arranged as one or more stacked cascades of converting cells, with each voltage converting cell in the one or more stacked cascades of conversion cells sharing at least one capacitor element with a neighboring voltage converting cell.

The plurality of controllers configured to independently control the voltage levels of the at least one energy storage element of each of the multiple voltage converting cells may be configured to achieve a voltage balance for the multiple voltage converting cells.

The plurality of controllers configured to independently control the voltage levels of the at least one energy storage element of the each of the multiple voltage converting cells may be configured to determine and maintain at least one capacitor of the multiple voltage converting cells at a respective voltage level.

The plurality of controllers configured to controllably actuate the one or more of the plurality of switching devices may be configured to controllably actuate the one or more of the plurality of switching devices based at least in part on measured electrical properties of at least one of the multiple voltage converting cells.

The plurality of controllers may be configured to actuate the one or more of the plurality of switching devices according to a voltage level measured across at least one of the plurality energy storage elements.

The plurality of controllers configured to controllably actuate the one or more of the plurality of switching devices may include at least one controller configured to determine an adjustable duty cycle behavior for at least one of the multiple voltage converting cells.

The at least one controller configured to determine the adjustable duty cycle behavior for the at least one of the multiple voltage converting cells may be configured to continually compute the duty cycle behavior for the at least one of the multiple voltage converting cells that achieves a pre-determined output voltage for the voltage converter system, with other of the multiple voltage converting cells, excluding the at least one of the multiple voltage converting cells, configured with respective substantially fixed duty cycle values.

The plurality of controllers configured to determine the adjustable duty cycle behavior for the at least one of the multiple voltage converting cells may be configured to derive duty cycle characteristics for the multiple voltage converting cells to achieve a desired output voltage for the voltage converter system that optimizes one or more objective functions.

The one or more objective functions may include one or more of, for example, a) 1-norm objective function of all inductor currents in the voltage converter system to minimize overall current rating of the voltage converter system, b) a 2-norm squared objective function of all the inductor currents of the voltage converter system to minimize overall power loss in the voltage converter system, and/or c) an inf-norm objective function of all the inductor currents of the voltage converter system to minimize maximum currents levels in all the inductor currents.

At least one of the multiple voltage converting cells may include a Dual Active Half Bridge (DAHB) converter configuration cell that includes a primary side and a secondary side separated from the primary side by a transformer, with the primary side including one or more primary side energy storage elements and one or more primary side switches, and with the secondary side including one or more secondary side energy storage elements and one or more secondary side switching devices.

The at least one DAHB converter configuration cell may include two primary side capacitors, two primary side controllable switching devices, two secondary side capacitors, and two secondary side switching devices.

The plurality of controllers configured to independently control the voltage levels of the at least one energy storage element of each of the multiple voltage converting cells may include at least one dedicated controller for the at least one DAHB converter configuration cell, the at least one dedicated controller configured to controllably actuate the two primary side switching devices and the two secondary side switching devices according to one or more pre-determined switching sequences defined for a particular time interval.

The one or more switching sequences for the at least one DAHB converter configuration cell may be defined by duty cycles for the primary side and for the secondary side, and by a phase shift, $\phi$, between a primary side and a secondary side switching events.

The multiple voltage converting cells each may include a respective cell with the DAHB converter configuration cell, with the multiple voltage converting cells being arranged as one or more stacked cascades of the cells with the DAHB converter configuration cell connected to a load.

The multi-level arrangement of the multiple voltage converting cells may include a plurality of voltage converting cells arranged in multiple stacks of voltage converting cells connected to a load, with the plurality of controllers including a central controller in electrical communication with the multiple stacks of voltage converting cells to control electrical currents produced by the multiple stacks to power the load.

The load may include a multi-phase motor, with each of the multiple stacks of voltage converter cells providing a respective phased current for one of multi-phase inputs of the multi-phase motors, and the central controller may be configured to control duty cycles of one or more switching devices in the multiple stacks to produce the multi-phase currents that result in one or more of a specified motor speed or a specified motor torque.

The plurality of controllers may include an individual cell controller for each of the multiple voltage converting cells, with the each of the multiple voltage converting cells including two capacitors, two switching devices, and an inductor element arranged in a buck-boost converter configuration, and with the each individual cell controller for the each of the multiple voltage converting cells being configured to maintain a ratio between a first and second voltage levels of non-common terminals of the two capacitors at a specified level.

In some variations, a voltage conversion method is provided that includes obtaining electrical properties data representative of electrical properties of a voltage converter system comprising a plurality of energy storage elements and a plurality of switching devices, with each of the plurality of switching devices being electrically coupled to at least one of the plurality of the energy storage elements. The plurality of energy storage elements and the plurality of switching devices are configured in a multi-level arrangement of multiple voltage converting cells. The method further includes controllably actuating by a plurality of controllers coupled to the multiple voltage converting cells, based at least in part on the electrical properties data, one or more of the plurality of the switching devices to independently control voltage levels of at least one energy storage element of the multiple voltage converting cells.

Embodiments of the method may include at least some of the features described in the present disclosure, including at least some of the features described above in relation to the voltage converter system, as well as one or more of the following features.

Controllably actuating the one or more of the plurality of switching devices may include independently controlling the voltage levels of the at least one energy storage element of each of the multiple voltage converting cells to achieve a voltage balance for the multiple voltage converting cells.

Controllably actuating the one or more of the plurality of switching devices may include controllably actuating the one or more of the plurality of switching devices according to a voltage level measured across at least one of the plurality energy storage elements.

Controllably actuating the one or more of the plurality of switching devices may include determining an adjustable duty cycle behavior for at least one of the multiple voltage converting cells.

Determining the adjustable duty cycle behavior for the at least one of the multiple voltage converting cells may include continually computing the duty cycle behavior for the at least one of the multiple voltage converting cells that achieves a pre-determined output voltage for the voltage converter system, with other of the multiple voltage converting cells, excluding the at least one of the multiple voltage converting cells, configured with respective substantially fixed duty cycle values.

Determining the adjustable duty cycle behavior for the at least one of the multiple voltage converting cells may include deriving duty cycle characteristics for the multiple voltage converting cells to achieve a desired output voltage for the voltage converter system that optimizes one or more objective functions.

At least one of the multiple voltage converting cells may include a Dual Active Half Bridge (DAHB) converter configuration cell that includes a primary side and a secondary side separated from the primary side by a transformer, with the primary side including one or more primary side energy storage elements and one or more primary side switches, and with the secondary side including one or more secondary side energy storage elements and one or more secondary side switching devices. The at least one DAHB converter configuration cell may include two primary side capacitors, two primary side controllable switching devices, two secondary side capacitors, and two secondary side switching devices, and controllably actuating the one or more of the plurality of switching devices may include controllably actuating the two primary side switching devices and the two secondary side switching devices according to one or more pre-determined switching sequences defined for a particular time interval. The one or more switching sequences for the at least one DAHB converter configuration cell may be defined by duty cycles for the primary side and for the secondary side, and by a phase shift, $\phi$, between a primary side and a secondary side switching events.

The multi-level arrangement of the multiple voltage converting cells may include a plurality of voltage converting cells arranged in multiple stacks of voltage converting cells connected to a load, and controllably actuating the one or more of the plurality of the switching devices may include controlling, by a central controller from the plurality of controllers, electrical currents produced by the multiple stacks to power the load.

The load may include a multi-phase motor, with each of the multiple stacks of voltage converter cells providing a respective phased current for one of multi-phase inputs of the multi-phase motors, and controlling, by the central controller, the electrical currents produced by the multiple stacks may include controlling duty cycles of one or more switching devices in the multiple stacks to produce the multi-phase currents that result in one or more of a specified motor speed or a specified motor torque.

Controllably actuating the one or more of the plurality of switching devices further may include controlling individually, by a dedicated cell controller for at least one of the multiple voltage converting cells, the at least one of the multiple voltage converting cells that includes two capacitors, two switching devices, and an inductor element arranged in a buck-boost converter configuration, to maintain a ratio between a first and second voltage levels of non-common terminals of the two capacitors at a specified level.

The multi-level arrangement of the multiple voltage converting cells may include a plurality of voltage converting cells arranged in multiple stacks of voltage converting cells connected to a load, with each of the multiple voltage converting cell including a dedicated cell controller. Controllably actuating the one or more of the plurality of the switching devices may include controllably actuating, by the respective dedicated cell controller for the each of the multiple voltage converting cells, the one or more of the plurality of the switching devices to independently control voltage levels of the at least one energy storage element of the multiple voltage converting cells.

In some variations, a non-transitory computer readable media is provided that stores a set of instructions, executable on at least one programmable device, to obtain electrical properties data representative of electrical properties of a voltage converter system comprising a plurality of energy storage elements and a plurality of switching devices, with each of the plurality of switching devices being in electrical communication with at least one of the plurality of the energy storage elements. The plurality of energy storage elements and the plurality of switching devices are configured in a multi-level arrangement of multiple voltage converting cells. The set of instructions is further configured to cause the programmable device to controllably actuate by a plurality of controllers coupled to the multiple voltage converting cells, based at least in part on the electrical properties data, one or more of the plurality of the switching devices to independently control voltage levels of at least one energy storage element of the multiple voltage converting cells.

Embodiments of the computer readable media may include at least some of the features described in the present disclosure, including at least some of the features described above in relation to the system and method.

Other features and advantages of the invention are apparent from the following description, and from the claims.

BRIEF DESCRIPTION OF THE DRAWINGS

These and other aspects will now be described in detail with reference to the following drawings.

FIG. 22 is a flowchart of an example voltage conversion procedure based on the topologies and implementations described herein.

Like reference symbols in the various drawings indicate like elements.

DESCRIPTION

Figure 1:
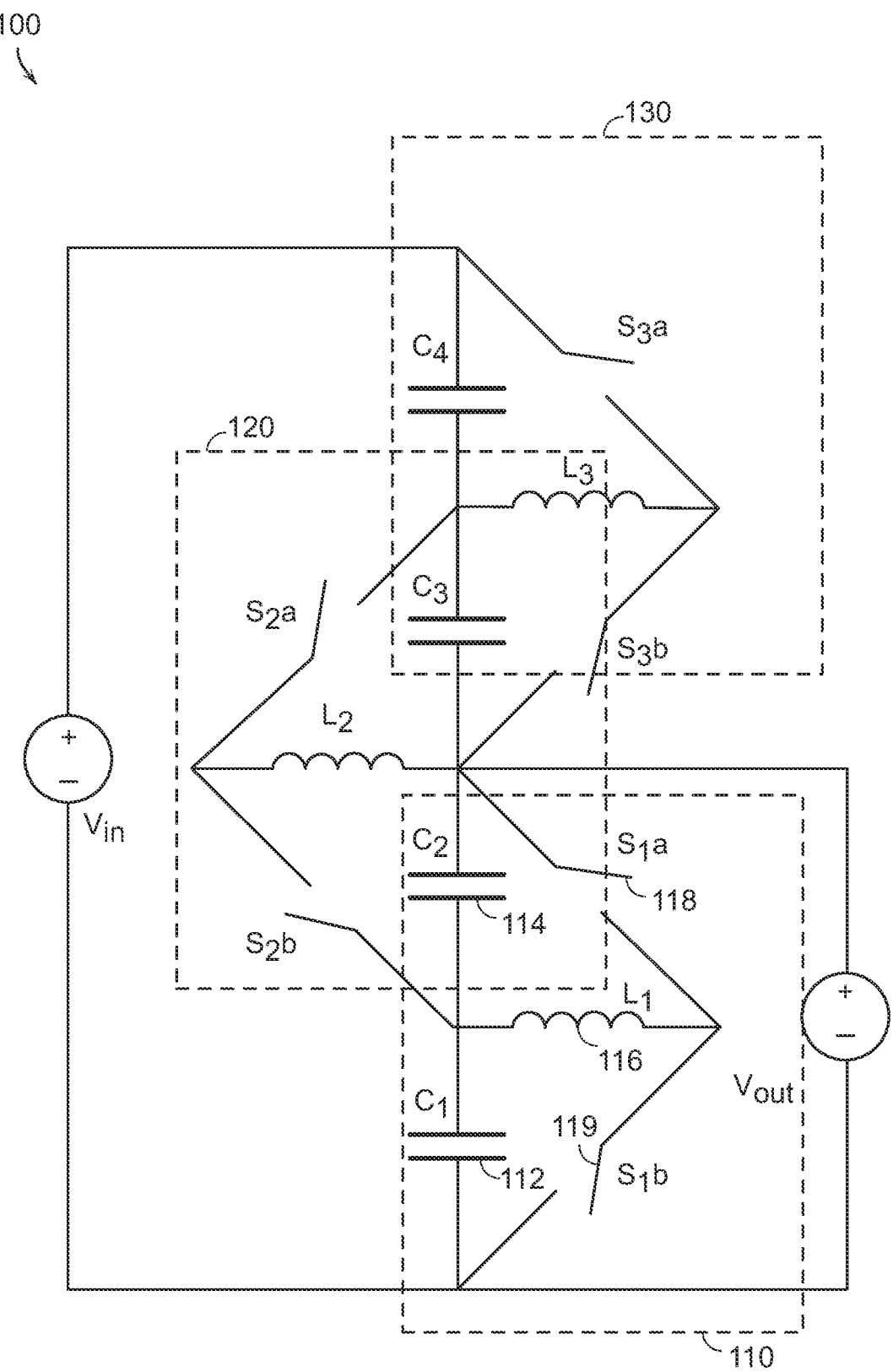
FIG. 1 is a circuit diagram of a three (3) cell stackable voltage conversion configuration (referred to as a Manhattan configuration).

Disclosed are circuits, systems, methods, and other implementations (including hardware, software, and hybrid hardware/software implementations) directed to multi-level power converter topologies (referred to as "Manhattan" topologies, and implemented using different types of basic, stackable, circuit units, as will be described in greater detail below). The topologies described herein are fully balanced, can function bidirectionally for both DC/AC and DC/DC modes of operation, and can be expanded to an arbitrary N number of levels. Power converters of the Manhattan topologies are comprised of discrete switching cells across which the input voltage can be arbitrarily distributed. Each of these switching cells can be individually controlled and can operate as a standalone unit. The nature of this topology yields inherent capacitor voltage balancing. Each of the cells (which may have similar configurations) can operate individually as two-level power converters, maintaining internal voltage balancing without the need for additional components. Moreover, the voltage balancing within the individual units is preserved when two or more individual cells are connected to form the multilevel power converter. Due to the simplified design, the component cells, when stacked, scale linearly with the number of circuit components, suggesting that there is no limit to the number of levels possible for the present multilevel power converter technology. As such, this technology has the potential to scale-up for large and simplified power-related industrial uses. Thus, in some embodiments, a proposed voltage converter system includes a plurality of energy storage elements (e.g., capacitors and/or inductors), a plurality of switching devices (e.g., different types of transistors, like MOSFET, FET, BJT) each in electrical communication with (i.e., electrically coupled to)

at least one of the plurality of the energy storage elements, with the plurality of energy storage elements and the plurality of switching devices being configured in a multi-level arrangement of multiple voltage converting cells. The converter system further includes a plurality of controllers to controllably actuate one or more of the plurality of switching devices to independently control voltage levels of at least one energy storage element of the multiple voltage converting cells. For example, each converting cell may have its own dedicated individual controller to control the voltage output of the cell. Alternatively, some of the multiple cells may have their own dedicated individual controller (be it a closed-loop controller, a programmable controller, or otherwise), with other voltage converter cells being controlled by a joint controller(s) controlling the behavior of those voltage converter cells. In some embodiments, a central controller may be used to facilitate control of the multi-level voltage converter system in conjunction with at least one dedicated local controller (e.g., a controller to regulate the electrical behavior of one or more of the nodes/cells of the system).

An example of a generalized topology of the implementations described herein (the "Manhattan Converter" topology) is shown in the circuit diagram of FIG. 1. Specifically, FIG. 1 is a circuit diagram of a three (3) cell stackable voltage conversion configuration 100. In this example, the three-cell configuration defines a five-level voltage conversion system. The configuration 100 includes a first voltage conversion cell 110, a second voltage conversion cell 120, and a third voltage conversion cell 130. As can be seen, in the example configuration of FIG. 1, each voltage conversion cell comprises two capacitors (e.g., in the cell 110 those are capacitors 112 and 114, also marked as capacitors $C_1$ and $C_2$), an inductor element (inductor 116 in the cell 110, also marked as $L_1$) and two switching devices (e.g., 118 and 119 for cell 110, marked as switches $s_1a$ and $s_1b$) that can be individually and independently controlled by a plurality of controllers (e.g., a central processor-based controller controlling the behavior of some or all of the cells, in conjunction with at least one dedicated controller regulating the behavior of an individual or a group of the multiple cells; in FIG. 1 the controller is not specifically depicted) to thus control the duty cycle and periodicity of each of the stackable cells. As illustrated in FIG. 1, each cell shares at least one capacitor with an adjacent (neighboring cell). For example, the voltage conversion cell 110 and the voltage conversion cell 120 share the capacitor 114. In some embodiments, the various cells comprising a multi-cell voltage conversion topology can have different energy storage configurations, including some in which two or more cells share one or more components (storage elements, and/or switching devices). The plurality of controllers (coupled to the various voltage conversion cells in some cooperative configuration) can determine appropriate the behavior of the switching devices resulting for a voltage conversion system particular circuit configuration/topology.

Although the circuit topology in FIG. 1 is capable of bidirectionally converting DC/DC or DC/AC, for the sake of brevity the present discussion considers the converter in step-down buck-mode operation and the terms are labeled as such. Likewise, any node along the center capacitor stack can be utilized as the output, but the present discussion focuses on implementations where the output is at the center node and the derived equations (discussed below) to represent the voltages and/or currents at different cells or components reflect that. The center node is defined as having the same number of series capacitors above it as below it. It is important to note that, depending on the application, utilizing a non-centered node as the output may be used, and may be advantageous over using the center node.

The topologies described herein are expandable to an arbitrary N number of levels with component quantities scaling linearly, where N and K represent the number of levels and number of stackable unit cells, respectively, and where, generally, N=K+2 In some embodiments, output is taken at the center node which is defined as having the same number of series capacitors above it as below it. This is achieved through individually stackable and controllable unit cells (more particularly discussed below). The stacked cell nature of this topology eliminates the need for a bulk capacitance between the input and reference or between the output and reference. The series combination of the cell capacitances serves to support both the input and output nodes as well as the voltages within each cell. The individual capacitor voltages can be controlled as a function of the duty cycles of each unit cell, allowing for the voltage across the entire stack to be balanced across the cells arbitrarily. This allows for the control and conversion of voltages higher than the voltage rating of any individual semiconductor or passive component. Since the output voltage is the sum of the capacitor voltages between the output node and reference, the ability to balance the capacitor voltages to any arbitrary ratio also allows for the output voltage to swing between full input voltage and reference.

Figure 2:
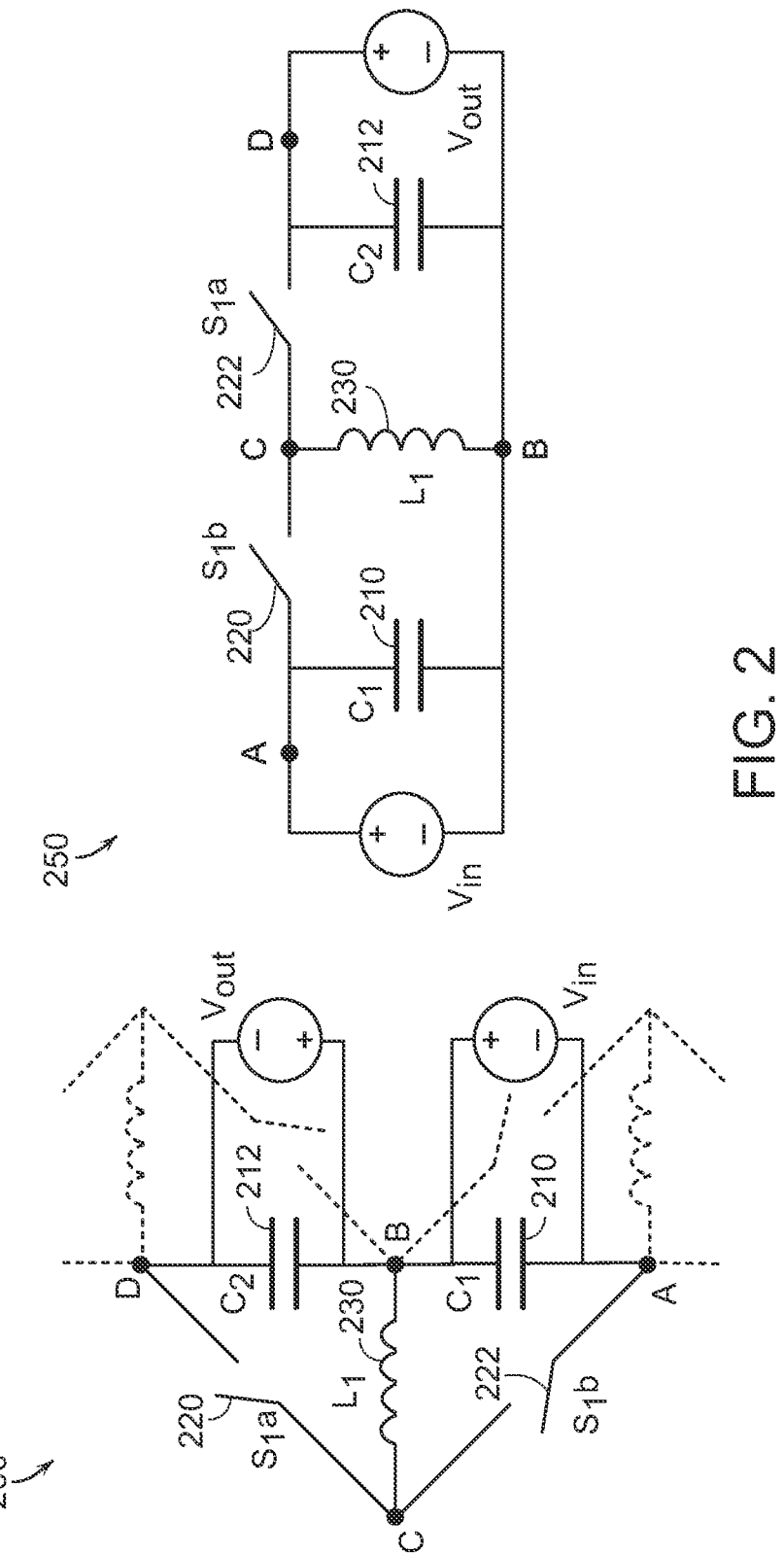
FIG. 2 is a circuit diagram of a unit cell that can be used in multi-level voltage converter systems.

The stackable unit cell that composes the multilevel topology (such as the topology depicted in FIG. 1, and the further example topologies of FIGS. 3-4) is illustrated in FIG. 2, showing a circuit diagram of a unit cell 200. Dashed lines denote connections to adjacent cells. Current flows through each unit cell in the same way it does in a typical inverting buck-boost converter. An equivalent circuit arrangement 250 is provided next to the circuit of the unit cell 200. The equivalent circuit 250 of FIG. 2 shows an inverting buck-boost converter with the nodes and components labeled as they align with the repeatable unit cell 200. In this manner, each unit cell can be considered an individual inverting buck-boost converter, and the stacking of unit cells a quasi-cascade.

The unit cell 200 (and similarly the equivalent circuit 250) includes capacitors 210 and 212, an inductor element 230, and two controllable switching devices (e.g., transistors) 220 and 222 that can be individually electrically actuated by control signaling provided through a controller (not shown in the figures) according to control procedure(s) discussed in greater detail below. By configuring each cell as an individual (possibly independent) inverter buck-boost converter, the individual cells can be stacked (to form a quasi-cascade of converters), resulting in a topology that can eliminate the need for bulk capacitance between the input and reference and/or output to reference as the series combination of the cell capacitance serves to support both the input and output nodes, as well as the voltages within each cell.

The individual capacitor voltages can be controlled as a function of the duty cycles of at least one of the unit cells, allowing for the voltage across an entire voltage conversion stack to be balanced across each cell to any arbitrary ratio. This allows the control and conversion of voltages higher than the voltage rating of any individual semiconductor or passive component. Because the output voltage is simply the sum of the capacitor voltages between the output node and reference, the ability to balance the capacitor voltages to any arbitrary ratio also allows for the output voltage to swing between full input voltage and reference. The individual cells may, in some embodiments, be individually controlled to thus facilitate the modular nature of the multi-level voltage conversion implementation. Individual control can be supplemented through joint control (achieved through one or more controllers assigned to regulate a group of cells). Such joint control may also include central control (by a central controller) to provide global control signaling for some or all of the voltage conversion cells.

Figure 3:
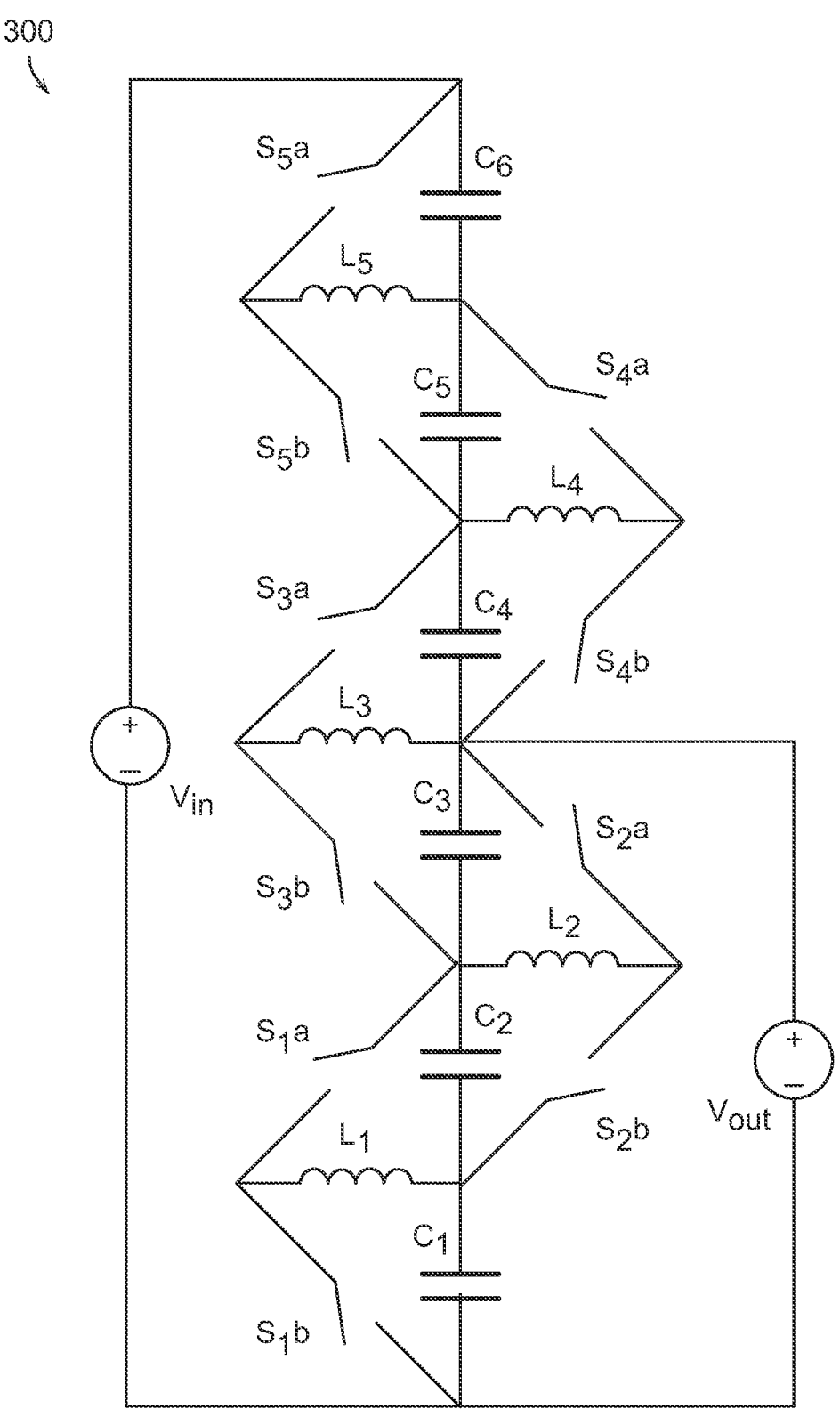
FIG. 3 is a circuit diagram of an example stacked voltage conversion system with five levels.
Figure 4:
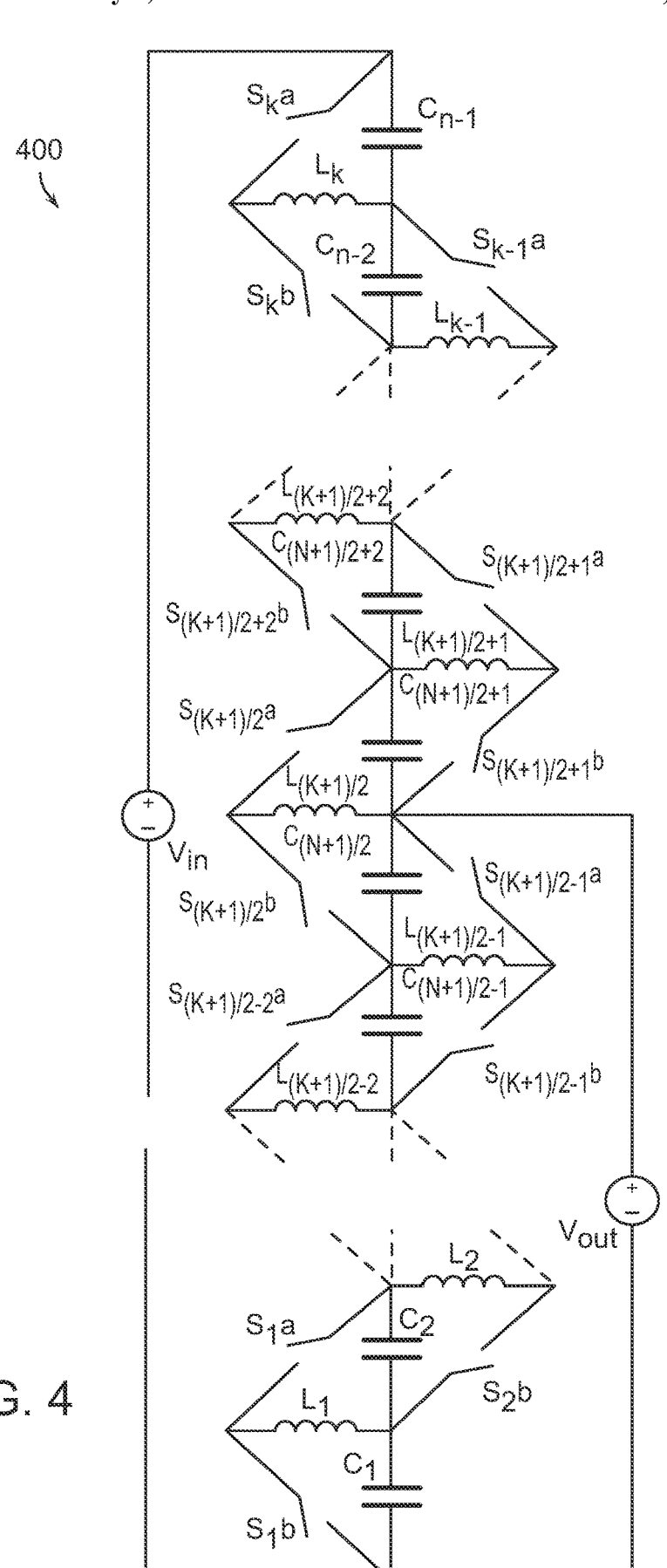
FIG. 4 is a circuit diagram of a generalized multi-level Manhattan topology with K cells, and N voltage levels.

FIG. 3 is another example of a stacked voltage conversion system 300, which includes five levels (i.e., the system 300 includes five individual cells, each of which may be of a similar configuration as the unit cell 200 depicted in FIG. 2). FIG. 4 includes a generalized topology 400 with K cells, and N voltage levels (as noted, generally, N=K+2).

Figure 5:
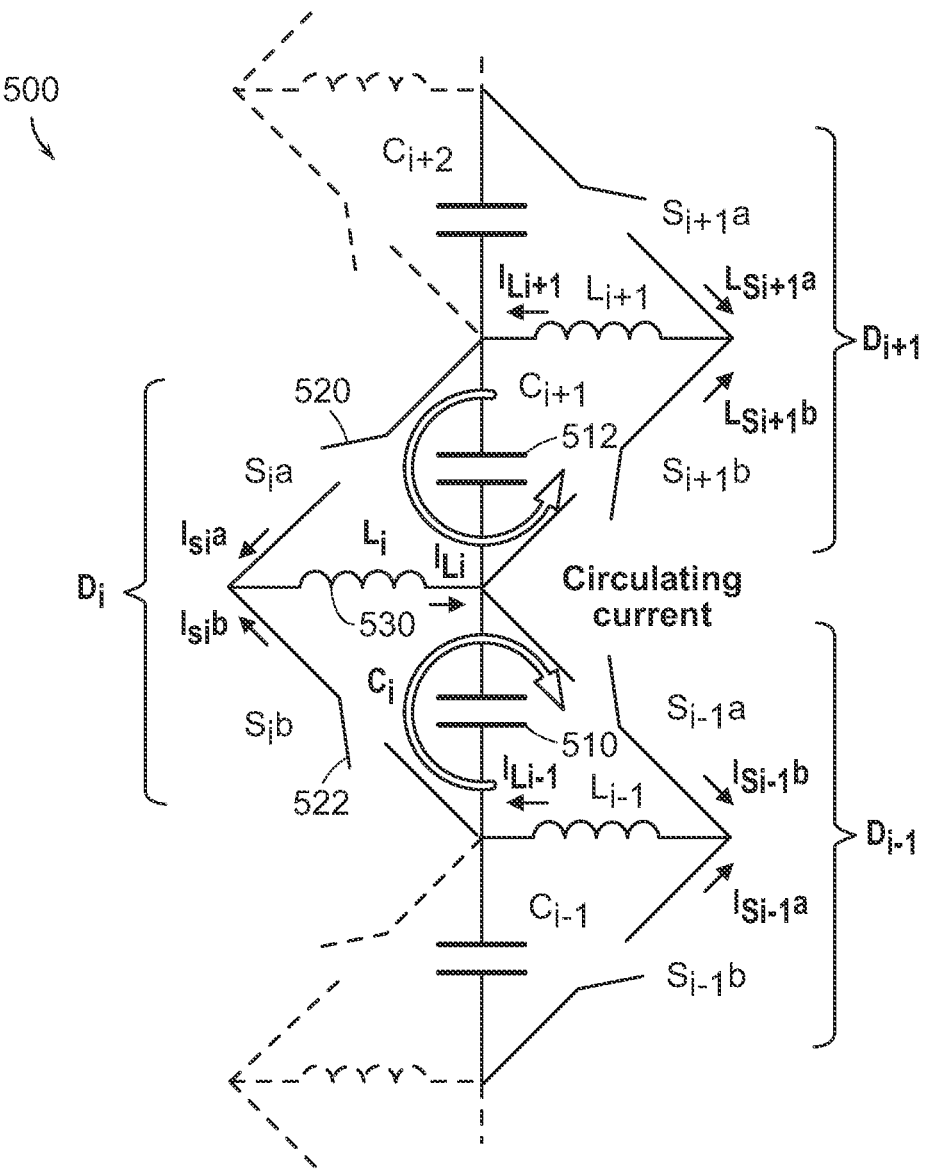
FIG. 5 includes a portion of a stacked topology in which current paths are illustrated.

The quasi-cascade nature of the proposed topology described herein induces circulating currents between adjacent cells. General current paths can be seen in FIG. 5, depicting a portion of a stacked topology 500 comprising three cells (constituted by 4 capacitors $C_{i-1}$, $C_i$, $C_{i+1}$, $C_{i+2}$). Following the path of the currents above and below an inductor 530 (marked $L_i$) forming a converter cell with capacitors 510 and 512 (marked $C_i$ and $C_{i+1}$), and switches 520 and 522 ($S_ia$ and $S_ib$), it can be seen that the center-most inductor 530 ($L_i$) must support the inductor currents of the cells above and below it. The exact ratio of currents between the inductors is a function of the duty cycles of each cell and the number of stacked cells, as will become apparent below.

Before discussing the current/voltage control procedures to control the voltages at different cell comprising a stackable voltage conversion system, the equations and relationships governing the voltages at different points of the stack topology will be described. The behavior of a stacked converter will be discussed in relation to a five (5) cell, 7 level converter, such as voltage conversion system 600 depicted in the circuit diagram of FIG. 6, but similar derivation of the governing relationship can be applied to topologies of any number of cells (and corresponding number of voltage levels). Using the notation shown in FIG. 6, the equations for average switching current, inductor current, and capacitor voltages are as follows:

$$V_{C_i} = V_{C_i+1}\left(\frac{D_i}{1-D_i}\right), \tag{1a}$$

$$I_{L_i} = I_{s_i a} + I_{s_i b}, \tag{1b}$$

$$I_{L_i} = I_{s_{i-1} a} + I_{s_{i+1} b}, \tag{1c}$$

$$I_{s_i a} = I_{L_i}(1 - D_i), \tag{1d}$$

$$I_{s_i b} = I_{L_i} D_i, \tag{1e}$$

where Equations (1a)-(1e) align with the equations for a typical inverting buck boost converter and hold true for each individual unit cell within the multilevel converter. In the above equations, the notation $D_i$ represents the duty cycle for the cell.

The output voltage, taken at the node labeled $V_3$ (fourth level), is the sum of all capacitors voltages between it and reference. Iteratively substituting in Equation (1a) for each cell below the output and algebraically rearranging in terms of $V_{C6}$ produces the following sequence of equations:

$$V_{out} = V_{C1} + V_{C2} + V_{C3} \tag{2}$$

$$V_{C1} + V_{C2} + V_{C3} = \left(\frac{D_1}{1-D_1}\right)\left(\frac{D_2}{1-D_2}\right)\left(\frac{D_3}{1-D_3}\right) \tag{3}$$

-continued $$V_{out} = \tag{4}$$

$$V_{C6}\left(\left(\left(\frac{D_1}{1-D_1}\right)\left(\frac{D_2}{1-D_2}\right)\left(\frac{D_3}{1-D_3}\right)\left(\frac{D_4}{1-D_4}\right)\left(\frac{D_5}{1-D_5}\right)+\right.\right.$$
$$\left.\left.\left(\frac{D_2}{1-D_2}\right)\left(\frac{D_3}{1-D_3}\right)\left(\frac{D_4}{1-D_4}\right)\left(\frac{D_5}{1-D_5}\right)+\left(\frac{D_3}{1-D_3}\right)\left(\frac{D_4}{1-D_4}\right)\left(\frac{D_5}{1-D_5}\right)\right)\right)$$

Repeating this iterative process while moving from the bottom cell to the top cell produces results in:

$$V_{in} = V_{C6}\left(\begin{array}{l}\left(\left(\frac{D_1}{1-D_1}\right)\left(\frac{D_2}{1-D_2}\right)\left(\frac{D_3}{1-D_3}\right)\left(\frac{D_4}{1-D_4}\right)\left(\frac{D_5}{1-D_5}\right)+\right.\\ \left(\frac{D_2}{1-D_2}\right)\left(\frac{D_3}{1-D_3}\right)\left(\frac{D_4}{1-D_4}\right)\left(\frac{D_5}{1-D_5}\right)+\\ \left(\frac{D_3}{1-D_3}\right)\left(\frac{D_4}{1-D_4}\right)\left(\frac{D_5}{1-D_5}\right)+\\ \left.\left(\frac{D_4}{1-D_4}\right)\left(\frac{D_5}{1-D_5}\right)+\left(\frac{D_5}{1-D_5}\right)+1\right.\end{array}\right) \tag{5}$$

Equations (4) and (5) thus provide expressions for $V_{in}$ and $V_{out}$ as a function of $V_{C6}$. Combining these two equations, simplifying, and using series sum and series product notation yields the following expression that gives $V_{out}$/Vin as a function of each cell's duty cycle:

$$\frac{V_{out}}{V_{in}} = \frac{\sum_{j=1}^{3}\left[\prod_{i=j}^{5}\left(\frac{D_j}{1-D_j}\right)\right]}{\sum_{j=1}^{5}\left[\prod_{i=j}^{5}\left(\frac{D_j}{1-D_j}\right)\right]+1} \tag{6}$$

A similar process can be used to find the voltage at any node along the center capacitor stack for a converter of N levels. Level n=0 is considered as reference voltage and level n=N as the input voltage. For clarity, these nodes are labeled $V_0$ and $V_6$ in FIG. 6, respectively. Level n is the voltage being calculated. This adapted derivation is as follows:

$$\frac{V_n}{V_{in}} = \begin{cases} \dfrac{\sum_{j=1}^{n-1}\left[\prod_{i=j}^{N-2}\left(\frac{D_j}{1-D_j}\right)\right]}{\sum_{j=1}^{N-2}\left[\prod_{i=j}^{N-2}\left(\frac{D_j}{1-D_j}\right)\right]+1} & 0 < n < N \\ 1 & n = N \\ 0 & n = 0 \end{cases} \tag{7}$$

It is important to note that Equation (7) provides the voltage of the node in question relative to reference, and not the individual capacitor voltages. Individual capacitor voltages can be found by calculating the voltages of the capacitor's two adjacent nodes and taking the difference.

Figure 6:
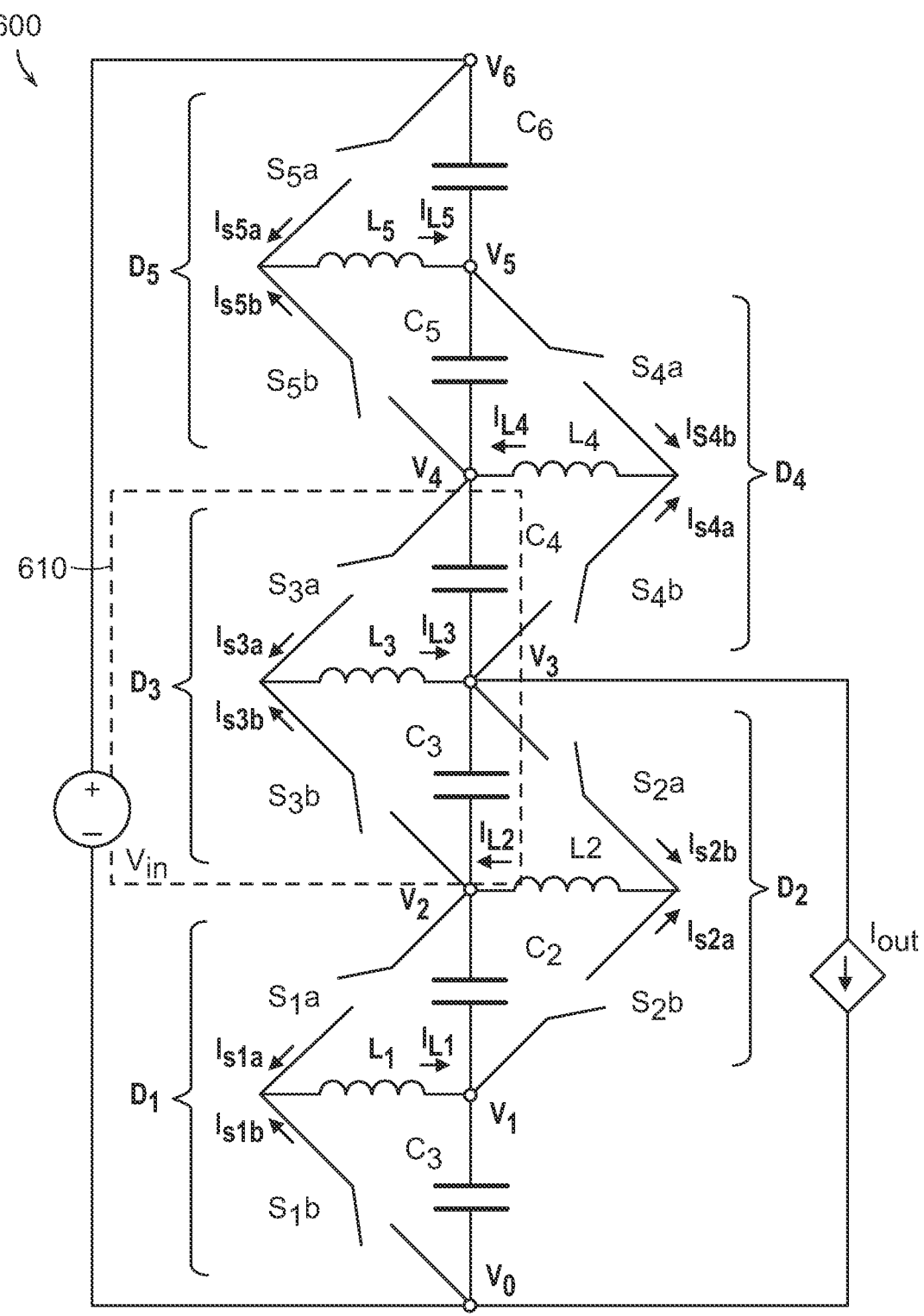
FIG. 6 is a circuit diagram with illustrated current paths for a seven-level converter with five voltage conversion cells.

Deriving the equations for currents begins at the middle node. The middle node is labeled $V_3$ in the example seven-level converter in FIG. 6. Equation (1c), above, serves to link two adjacent cells and is modified for taking the output at the middle node:

$$I_{L_3} = I_{s_4 b} + I_{s_2 a} + I_{out}, \tag{8}$$

where $I_{L_3}$ is the average current through the middle cell inductor. Iteratively substituting in Equations (1c), (1d), and (1e), alongside algebraic manipulation, produces:

$$I_{s_{4b}} = I_{L_3} \frac{D_3(1-D_4)}{1-D_4(1-D_5)} \quad (9)$$

$$I_{s_{2a}} = I_{L_3} \frac{D_2(1-D_3)}{1-D_1(1-D_2)} \quad (10)$$

which provides $I_{s_{4b}}$ and $I_{s_{2a}}$ as functions of exclusively D and $I_{L_3}$. Substituting (9) and (10) into (8) and algebraically rearranging terms, results in:

$$I_{L_3} = I_{out}\left(1 - \frac{D_3(1-D_4)}{1-D_4(1-D_5)} - \frac{D_2(1-D_3)}{1-D_1(1-D_2)}\right) \quad (11)$$

which provides the average current through the middle inductor as a function of output current $I_{out}$ and duty cycles D. This same process can be taken to find the average current through the middle inductor for any odd-numbered level converter as a function of output current. This adaptation is as follows:

$$\frac{I_{out}}{I_j} = 1 - \frac{D_m(1-D_{m+1})}{1-\cfrac{D_{m+1}(1-D_{m+2})}{1-\cfrac{D_{m+2}(1-D_{m+3})}{\dots}}} - \frac{D_{m-1}(1-D_m)}{1-\cfrac{D_{m-2}(1-D_{m-1})}{1-\cfrac{D_{m-3}(1-D_{m-2})}{\dots}}} \quad (12)$$

where m is used to denote the middle inductor (for the 7-level converter of FIG. 6, m=3).

Lastly, the relationship between a known inductor current $I_{Lj}$ and any two adjacent inductor currents $I_{Lj-1}$ and $I_{Lj+1}$ can be calculated using the following equations:

$$\frac{I_{j+1}}{I_j} = 1 - \frac{D_j}{1-\cfrac{D_{j+1}(1-D_{j+2})}{1-\cfrac{D_{j+2}(1-D_{j+3})}{\dots}}} \quad (13)$$

$$\frac{I_{j-1}}{I_j} = \frac{1-D_j}{1-\cfrac{D_{j-2}(1-D_{j-1})}{1-\cfrac{D_{j-3}(1-D_{j-2})}{\dots}}} \quad (14)$$

resulting in Equations (13), (14), and (7) allowing for all inductor current and node voltages of any odd-numbered level converter of this topology to be calculated. These equations have been validated through simulation, the results of which are discussed below.

Figure 7:
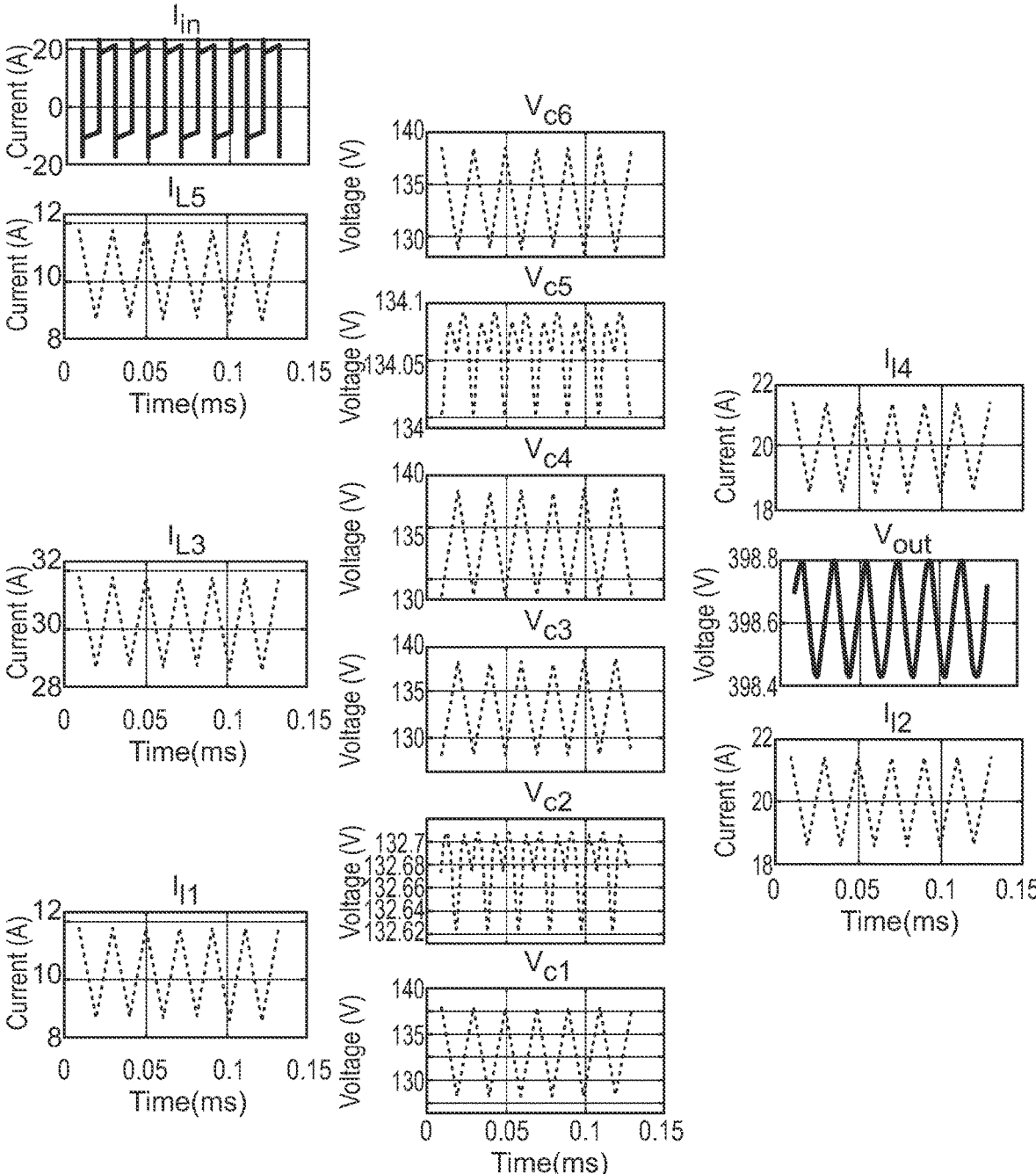
FIG. 7 includes graphs showing capacitor voltages and inductor currents as functions of time for the 7-level converter of FIG. 6.

Unlike other multilevel topologies, the allowable switching states of the topologies proposed herein (e.g., the Manhattan topology) do not depend on the entire converter as a whole, but rather just each unit cell. Each unit cell can be treated as an individual switching converter, meaning that the only switching state limitation is that both switches within the same unit cell cannot be on simultaneously. Beyond that there are no other limitations, duty cycles between different cells do not need to be synchronized or even operating at the same frequency. The example 7-level topology illustrated in FIG. 6 was tested and validated using the parameters $V_{in}$=800V, $I_{out}$=10A, $F_{sw}$=50 kHz, C=10 μF, and L=450 μH. FIG. 7 includes graphs showing capacitor voltages and inductor currents as functions of time for the 7-level converter of FIG. 6, with the above stated values, and a constant duty cycle (D) of 0.5 for all cells.

Figure 8:
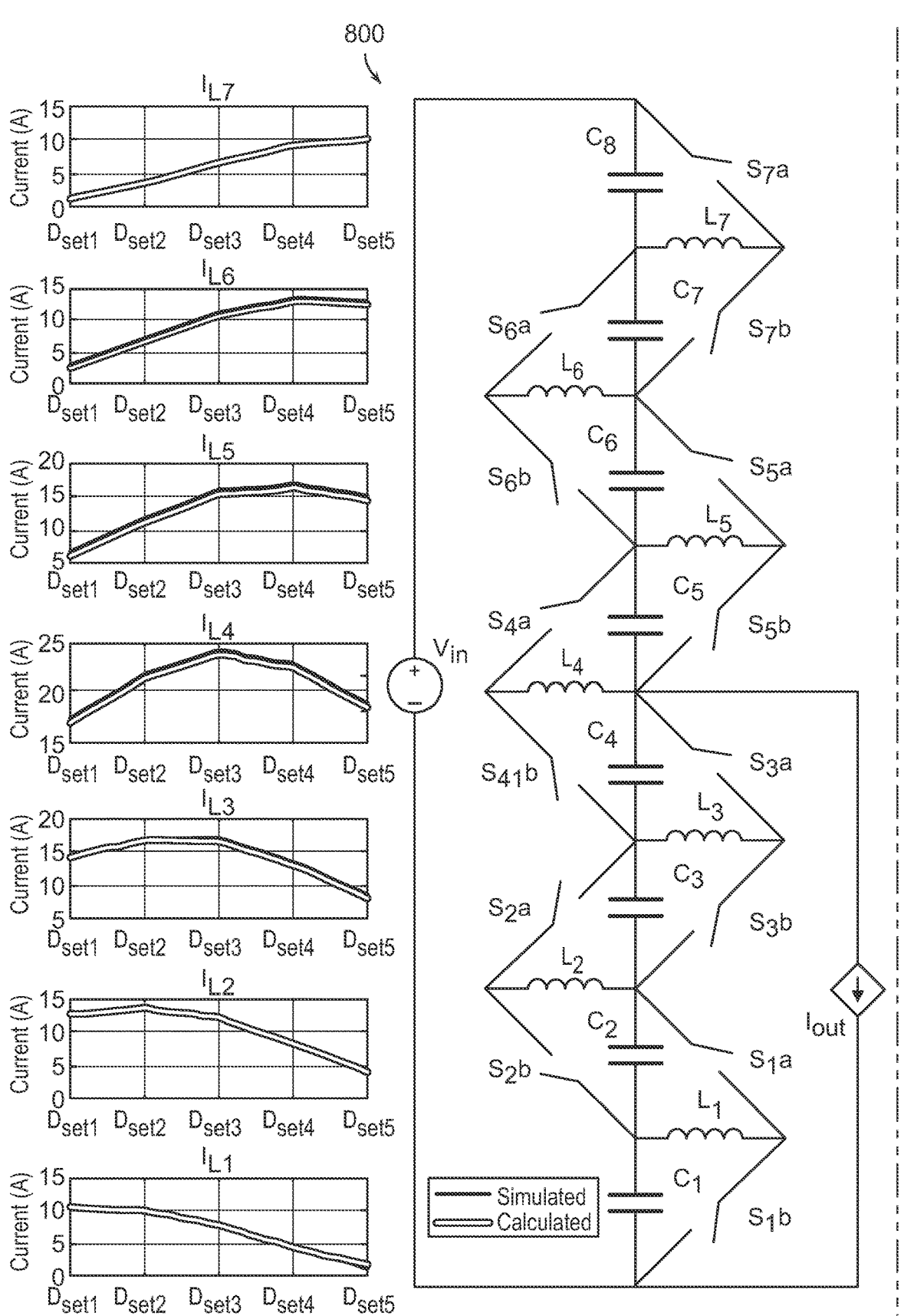
FIG. 8 includes a circuit diagram for a nine-level (seven cells), along with graphs showing the electrical behavior of the voltage conversion cells (e.g., capacitor voltages and inductor currents).
Figure 8:
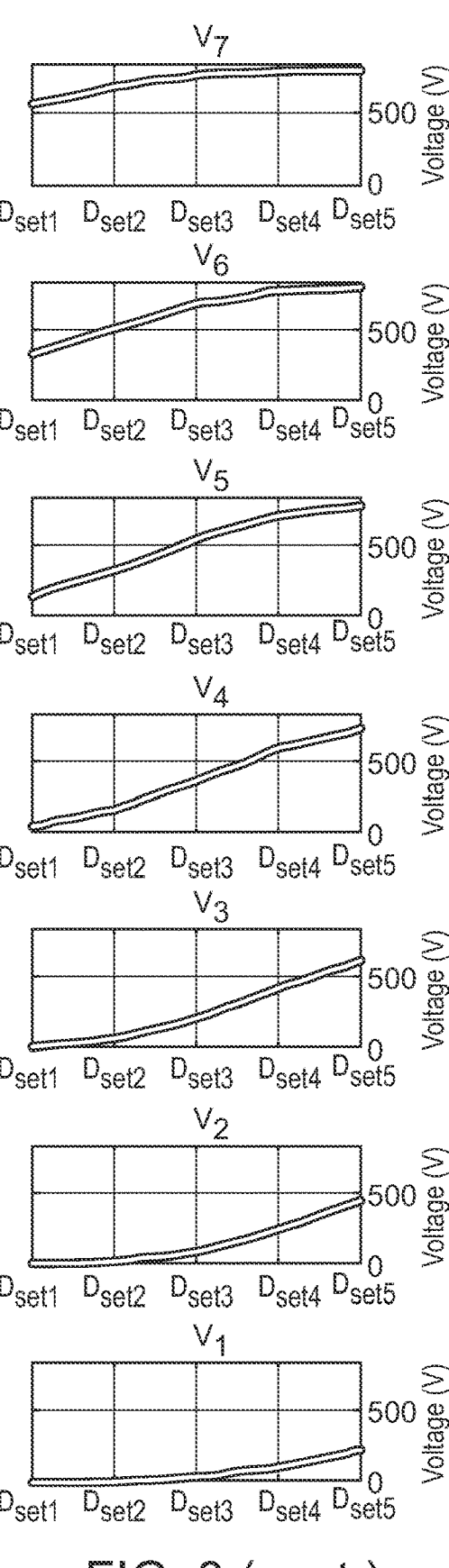

Consider next, with reference to FIG. 8, a nine-level converter 800 (seven cells), with respect to which the electrical behavior of the voltage conversion cells (e.g., capacitor voltages and inductor currents) was computed according to the equations developed for the 7-level converter of FIG. 6 (and adapted for a N-level converter), and also tested (through simulation) to verify the correctness of the equations representing the behavior of the implementations/topologies proposed herein. Five distinct sets of arbitrary duty cycles were used validate the derived equations and can be seen in Table 2, below. The use of arbitrary duty cycles was necessary because simply sweeping all duty cycles with the same value would neglect the possibility of duty cycles being inadvertently switched in the derived equations.

TABLE 2

| | Duty cycle values for a 9-level converter | | | | | | |
|---|---|---|---|---|---|---|---|
| $D_{set}$ | $D_1$ | $D_2$ | $D_3$ | $D_4$ | $D_5$ | $D_6$ | $D_7$ |
| $D_{set1}$ | 0.10 | 0.16 | 0.22 | 0.28 | 0.36 | 0.42 | 0.50 |
| $D_{set2}$ | 0.20 | 0.26 | 0.32 | 0.38 | 0.46 | 0.52 | 0.60 |
| $D_{set3}$ | 0.30 | 0.36 | 0.42 | 0.48 | 0.56 | 0.62 | 0.70 |
| $D_{set4}$ | 0.40 | 0.46 | 0.52 | 0.58 | 0.66 | 0.72 | 0.80 |
| $D_{set5}$ | 0.50 | 0.56 | 0.62 | 0.68 | 0.76 | 0.82 | 0.90 |

As can be seen in FIG. 8, the calculated currents/voltages match the simulated currents/voltages. Slight disagreements between the simulated and computed behaviors can be attributed to simulation non-idealities.

As noted, the behavior of the voltage converter implementations described herein can be controlled through control of the duty cycles for the individual cells comprising the converters. Two example methods of duty cycle control are described herein, but it is to be noted that other control methods/procedures may be used. The 7-level converter 600 depicted in FIG. 6 is used to illustrate the two proposed example control processes. For the purposes of the present discussion, all unit cells have the same capacitor and inductor values. The switches are ideal and the switching is synchronized. For both of the example control processes/methods, the output voltage is swung from reference to input voltage with a constant output current equal to $I_{out}$.

Figure 9:
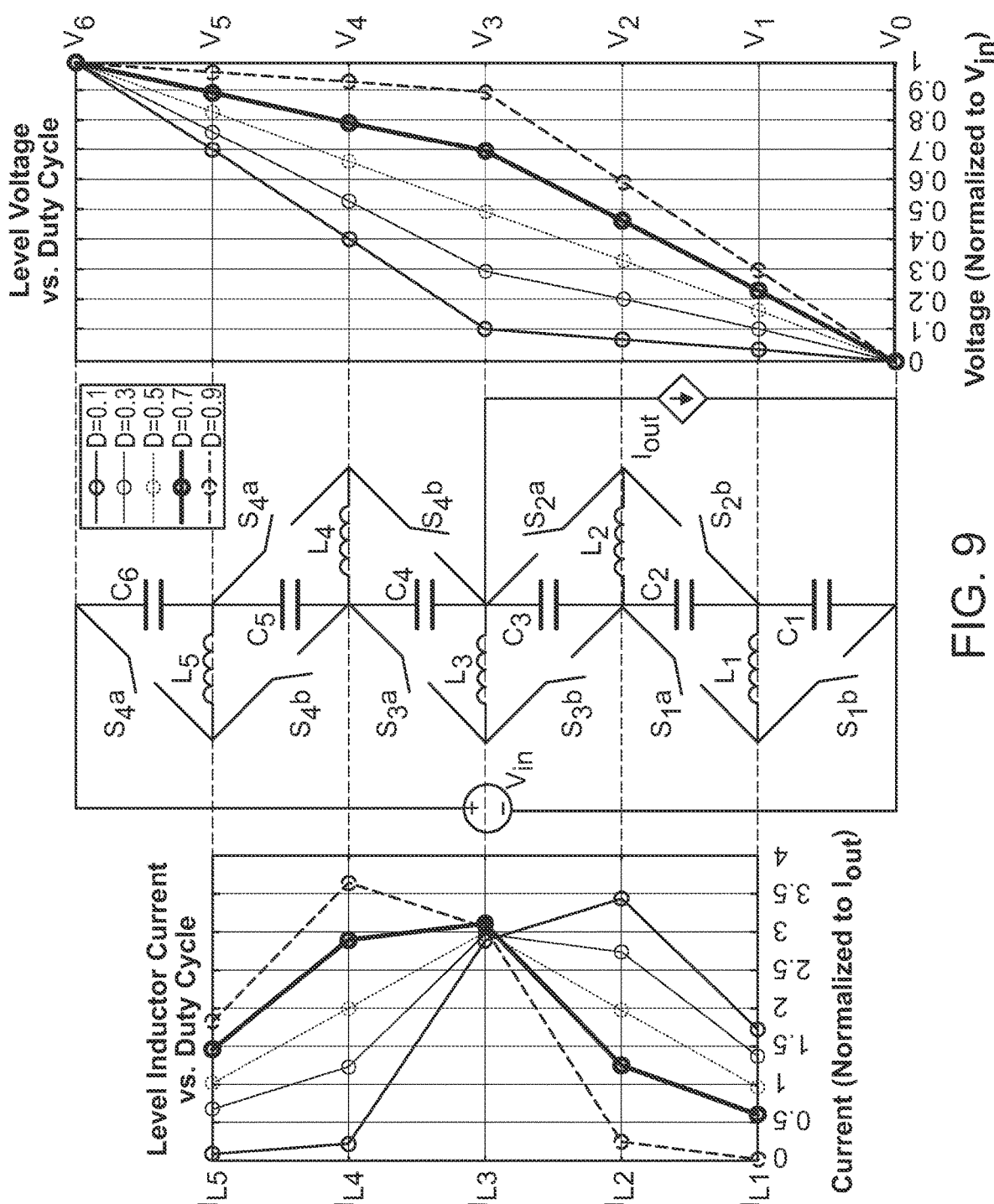
FIG. 9 is a circuit diagram for a seven-level converter with graphs showing the electrical behavior of the various components when the duty cycle of the center unit cell was swept from 0 to 1.

In a first example control method, the duty cycles for all but a single cell are set to a constant (static) value such as 0.5 (e.g., for the 7-level converter 600, the duty cycle for the center cell 610, comprising the components $L_3$, $S_3a$, $S_3b$, $C_4$, and $C_5$ is the cell that is controllably varied to control the current/voltage behavior of the converter, while the duty cycles for the other cells are maintained at 0.5, or some other fixed values). The output voltage, $V_{out}$, is thus controlled solely by the duty cycle $D_3$ of the center unit cell. The results of sweeping the duty cycle of the center unit cell from 0 to 1 while holding the other cells constant at D=0.5 can be seen in FIG. 9. The first control method thus results in ideal splitting of cell voltages over the entire the duty cycle sweep. The capacitor voltages above the output node evenly split the voltage $V_{in}$-$V_{out}$ while the capacitor voltages below the output node evenly split the output voltage $V_{out}$. Furthermore, the relationship between $D_3$ and $V_{out}$/Vin is linear. The average current through the center inductor $L_3$ is constant throughout the sweep at three (3) times the output current, which can be attributed to the circulating currents between adjacent cells.

A second example control method involves using the derived fundamental equations (as more fully presented in the appended materials) in conjunction with an optimization procedure (such as MATLAB's fmincon optimization function) to determine optimized duty cycles for one or more of the cells of a converter. In some embodiments, one constraint that can be imposed for the optimization procedure is to require that the middle node's voltage be controlled to a predetermined desired voltage which is swept from reference to $V_{in}$ (this constraint is referred to as the equality constraint). Another constraint that may be imposed is the inequality constraint, which is configured to ensure that no single capacitor voltage is greater than some voltage level (e.g., no single capacitor voltage is greater than one-third of the input voltage). In this example, the value of one-third is chosen as being at the extremes of the output voltage swing for the three capacitors in series that hold the full input voltage, and one-third represents ideal voltage splitting. For the example optimization procedure of the second example control method, three objective functions are considered (of course, there are many other possible objective functions that can be used):

1) A 1-norm of all inductor currents, which represents a minimization of overall current rating.
2) A 2-norm squared of all inductor currents, which represents a minimization of overall power loss.
3) An inf-norm of all inductor currents, which represents a minimization of the maximum current in the set of all inductor currents.

The results of the optimization with the 1-norm and 2-norm squared are identical, suggesting that the optimal duty cycles for minimizing the overall current rating and minimizing the $I^2R$ power losses are the same. The results are similar for the inf-norm optimization. It is worth noting, however, that the 1-norm and 2-norm optimizations effectively turn cells off at the extremes of the output voltage swing while the inf-norm optimization keeps them on while allocating proportionally small voltage across them. The maximum current through any inductor throughout the output voltage sweep is less than 1.5× the output current for all optimization methods, a substantial reduction over the non-optimized control method.

While the above control methods are described with reference to controlling the central node (i.e., cell 3 in a seven-cell configuration that corresponding to a 9-level converter), in some embodiments, a non-central cell can be controlled (by controllably adjusting its duty cycle). In some embodiments, more than a single cell of a multi-cell converter can be controlled (e.g., dynamically adjusting the duty cycles of two or more cells in a multi-cell converter).

Additional details about techniques for switching and voltage/current control functionality (through duty cycle control) are also provided in US 2021/0126522 A1, entitled "Methods, Systems, and Devices for Soft Switching of Power Converters," the content of which is hereby incorporated by reference in its entirety.

Thus, in some embodiments, a voltage converter system is provided that includes a plurality of energy storage elements (e.g., capacitors and inductors), and a plurality of switching devices, each in electrical communication with at least one of the plurality of the energy storage elements, with the plurality of energy storage elements and the plurality of switching devices being configured in a multi-level arrangement of multiple voltage converting cells (such as the arrangements depicted in FIGS. 1 and 3-6). The voltage converter system further includes a plurality of controllers (which may include processor-based controllers and/or closed-loop controllers such as the different controller types shown in FIG. 10) to controllably actuate one or more of the plurality of switching devices to independently control voltage levels of at least one energy storage element of the multiple voltage converting cells. In some examples, each of the multiple voltage converting cells may include an arrangement of two capacitors and an inductor that define a buck-boost converter circuit (such as the circuits 200 and 250 illustrated in FIG. 2). The multiple voltage converting cells may be arranged as one or more stacked cascades of converting cells (for example, FIG. 10, discussed more particularly below, shows three stacks, each with a plurality of voltage converting cells/units), with each voltage converting cell in the one or more stacked cascades of conversion cells sharing at least one capacitor element with a neighboring voltage converting cell (as illustrated in FIG. 1, the voltage conversion cells of FIG. 10 may or may not share capacitors with each other).

In some embodiments, the plurality of controllers configured to independently control the voltage levels of the at least one energy storage element of each of the multiple voltage converting cells may be configured to achieve a voltage balance for the multiple voltage converting cells. The plurality of controllers configured to independently control the voltage levels of the at least one energy storage element of the each of the multiple voltage converting cells may be configured to determine and maintain at least one capacitor of the multiple voltage converting cells at a respective voltage level. The plurality of controllers configured to controllably actuate the one or more of the plurality of switching devices may be configured to controllably actuate the one or more of the plurality of switching devices based at least in part on measured electrical properties of at least one of the multiple voltage converting cells. In such embodiments, the plurality of controllers may be configured to actuate the one or more of the plurality of switching devices according to a voltage level measured across at least one of the plurality energy storage elements (e.g., to change the duty cycle so as to increase or decrease the voltage of the cell being controlled, as needed).

The plurality controller configured to controllably actuate the one or more of the plurality of switching devices may include at least one controller configured to determine an adjustable duty cycle behavior for at least one of the multiple voltage converting cells. The at least one controller may be configured to continually (continuously or intermittently, at regular or irregular intervals) compute the duty cycle behavior for the at least one of the multiple voltage converting cells that achieves a pre-determined output voltage for the voltage converter system, with other of the multiple voltage converting cells, excluding the at least one of the multiple voltage converting cells, configured with respective substantially fixed duty cycle values. The at least one controller configured to determine the adjustable duty cycle behavior for the at least one of the multiple voltage converting cells may be configured to derive duty cycle characteristics for the multiple voltage converting cells to achieve a desired output voltage for the voltage converter system that optimizes one or more objective functions. In such situations, the one or more objective functions may include one or more of, for example, a) 1-norm objective function of all inductor currents in the voltage converter system to minimize overall current rating of the voltage converter system, b) a 2-norm squared objective function of all the inductor currents of the voltage converter system to minimize overall power loss in the voltage converter system, and/or c) an inf-norm objective function of all the inductor currents of the voltage converter system to minimize maximum currents levels in all the inductor currents.

Figure 10:
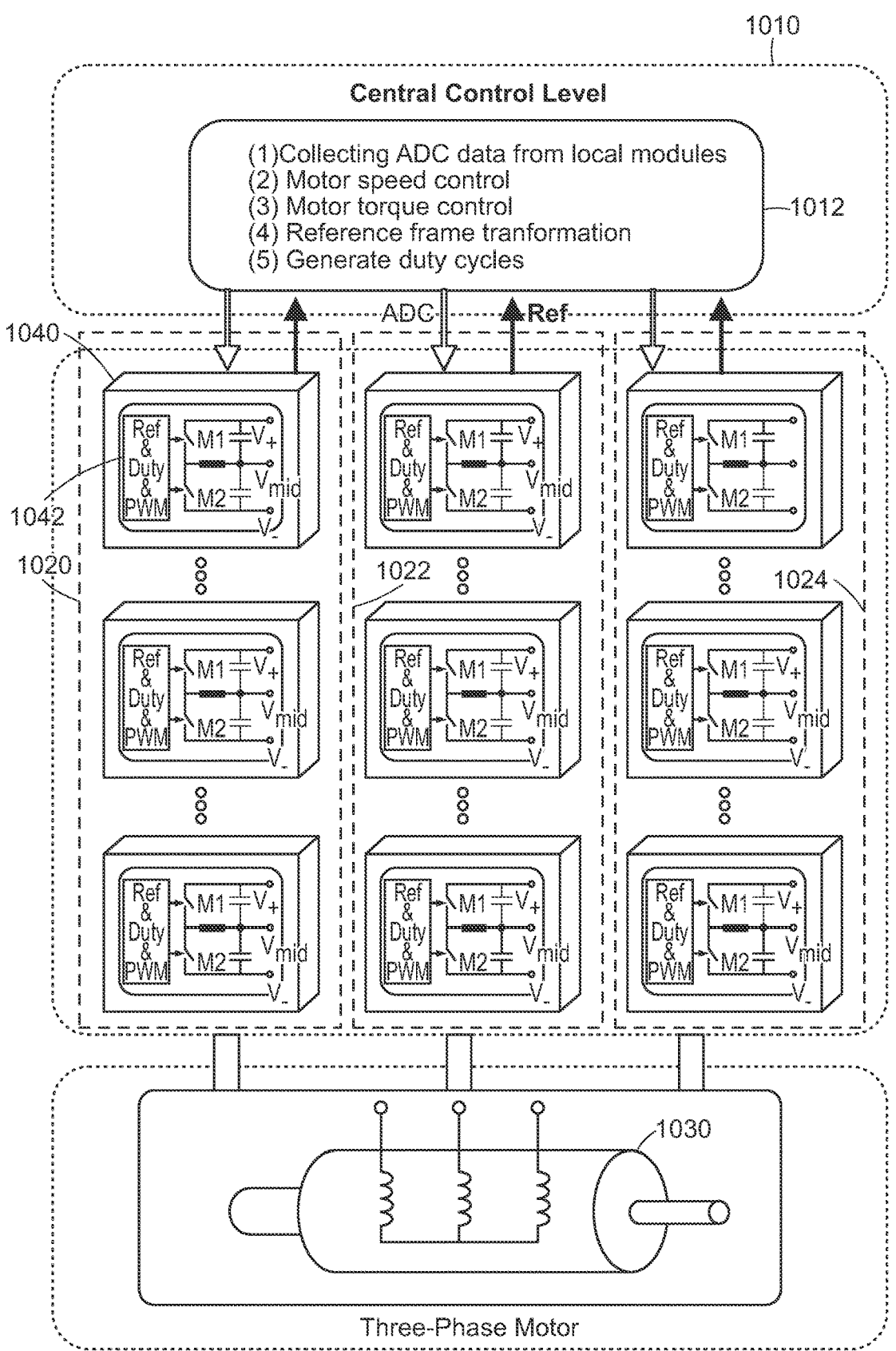
FIG. 10 is a schematic diagram of an example system for a stackable control structure to control operation of a three-phase motor.

With reference next to FIG. 10, a schematic diagram of a system 1000 for a stackable control structure to control operation of a three-phase motor is shown. The system 1000 includes a central controller 1010 (which may be implemented using a processor-based device) in electrical communication with three stackable multi-level converters 1020, 1022, and 1024 (each of which may be implemented similarly to the multi-converters described herein) that controllably provide a 3-phase currents to a motor 1030. The motor 1030 typically includes a stator (e.g., realized using magnets or having stator windings), and a rotor (e.g., realized using one or more permanent magnets). Upon controlled application of currents (provided by the stacked multi-level converters 1020, 1022, and 1024) through the stator windings, a magnetic field is generated inside the stator that interacts with the magnetic field of the permanent magnets and results in the generation of torque applied to the rotor, thus causing the rotor to rotate.

As illustrated in FIG. 10, the central controller performs continually or intermittently (at regular or irregular intervals) a control process 1012. The control process implemented by the central controller may include, in some embodiments, collecting digitized (ADC) samples of voltages and currents from the local modules (i.e., from one or more cells of the stackable multi-level converters). Then, the motor speed and torque are controlled in the dq reference frame by, for example, a Park/Clarke transformation. The generated references are distributed to the local power modules for duty cycle controlled PWM. In some embodiments, duty cycle computation can be performed at the central controller 1010. However, in some embodiments, the duty cycle computation to control the duty cycles of individual cells comprising the multi-level converters (of which there are three, namely, 1020, 1022, and 1024, for the example electrical-motor-based implementation of FIG. 10) can be done at respective individual controllers controlling one or more of the converter cells. As can be seen in the example of FIG. 10, each cell of the multi-level converters may include its own dedicated and localized controller (e.g., a PWN controller) to control the respective duty cycles for the switching devices of the each cell. For example, the voltage converter cell 1040 of the multi-converter 1020, includes a "Ref & Duty & PWM" controller 1042 (also referred to as a "cell controller") to control the electrical behavior of the cell 1040 (including to control the voltage levels at the capacitors of the cell 1040 through controlled adjustment of the duty cycles for the switches M1 and M2 of the cell 1040, achieved through controlled actuation of the switches M1 and M2). The controlled interactions of the various currents provided by the three multi-level converters coupled to the motor (achieved through the central controller 1010 and the individual controllers of the voltage converter cells to vary the voltage of the various cells in a desired manner) produces the desired motor behavior by the motor 1030. In some embodiments, the system 1000 may be implemented without a central controller, but with the individual cells each comprising their own respective controllers (be it a processor-based controller, a closed-loop controller, or otherwise). In some embodiments, some other arrangement of multiple controllers to control the voltages of the multi-level conversion system may be used (e.g., an individual controllers for cells/nodes with adjustable duty cycles, with some or all of the other cells having fixed duty cycles controlled by a central/global controller).

In some embodiments, the proposed multi-level converters may be used as an inverter. The center stage output connection allows the output of a multi-level converter to swing from rail to rail while maintaining evenly distributed voltage stresses above and below the center. This voltage sharing allows the use of switches with lower voltage rating, as each must support only a fraction of the input voltage. MOSFET conduction loss grows faster than linearly with blocking voltage (and switching speed reduces), so overall efficiency can be improved by sharing voltage between several low-voltage switches rather than using a single high-voltage switch.

Figure 11:
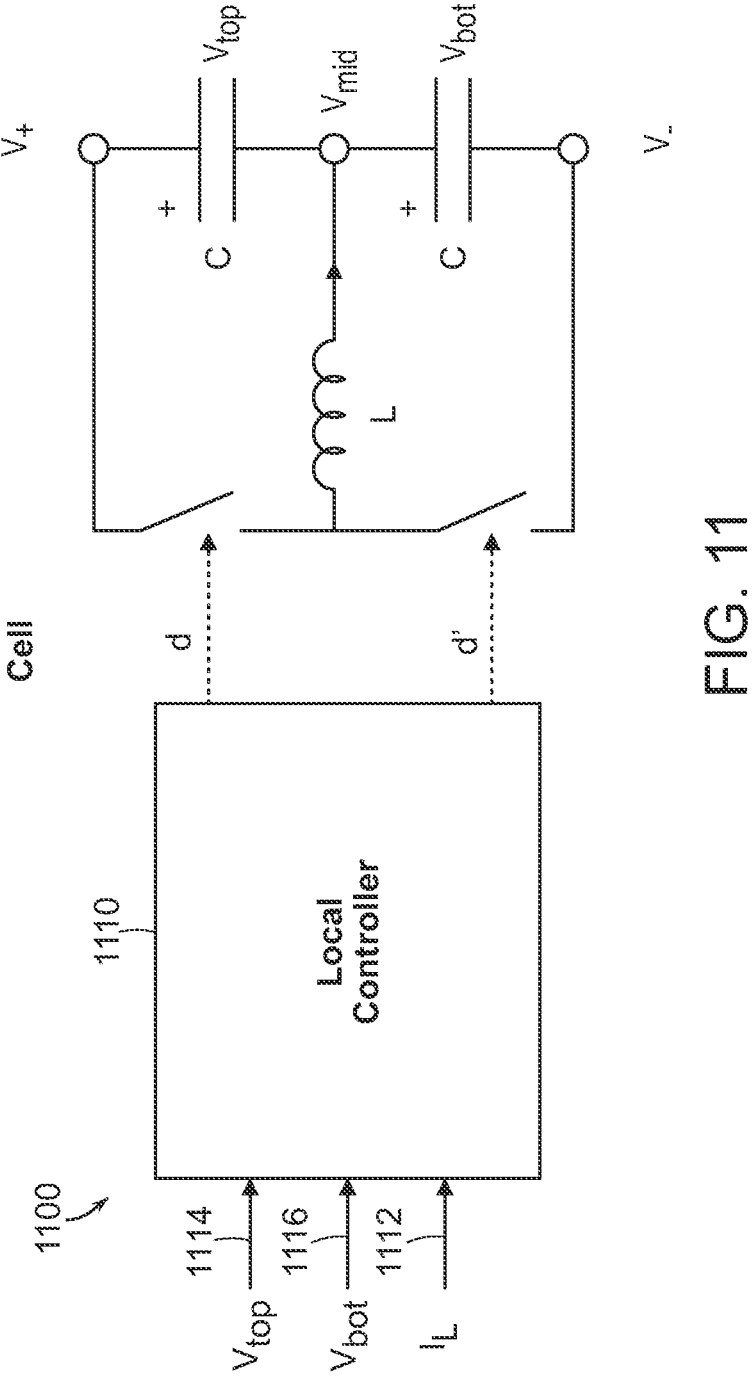
FIG. 11 is a schematic diagram of a unit cell that includes a local controller.

Because each unit cell of the multi-level converter generally contains an inductor and a capacitor, if such cells were used open loop, these components would be prone to resonating, leading to instability of the converter. To mitigate this, in some embodiments, each cell may be equipped with a local feedback loop to damp the resonance and provide high-bandwidth control of each capacitor voltage. FIG. 11 is a schematic diagram of a unit cell 1100 (such as any of the cells included with the multi-level converters described herein) that includes a local controller 1110. The local controller 1110 may be implemented as a processor-based device, an application-specific integrated circuit, or according to other types of controller circuitries, configured to generate control signaling (according to measured electrical characteristics of the unit cell, and/or global control signaling provided from a central controller such as the controller 1010 of FIG. 10). In some embodiments, the cell-level controller is given a reference, which sets the desired ratio between the top and bottom voltage in the cell. Each cell may have a second-order response, and can be controlled well with an inner inductor current loop ($I_L$, shown as signal 1112) and outer voltage loop that includes, for examples, the signals $V_{top}$ 1114, and $V_{bot}$ 1116, corresponding to the respective voltages measured across the top and bottom capacitors of the cell 1100. The local feedback also decouples the cells from each other. This simplifies control of the whole stack, and allows scaling of the number of cells without significant changes to controller compensation or design. This allows design reuse between inverters of different voltage requirements and economies of scale for making the unit cells.

Figure 12:
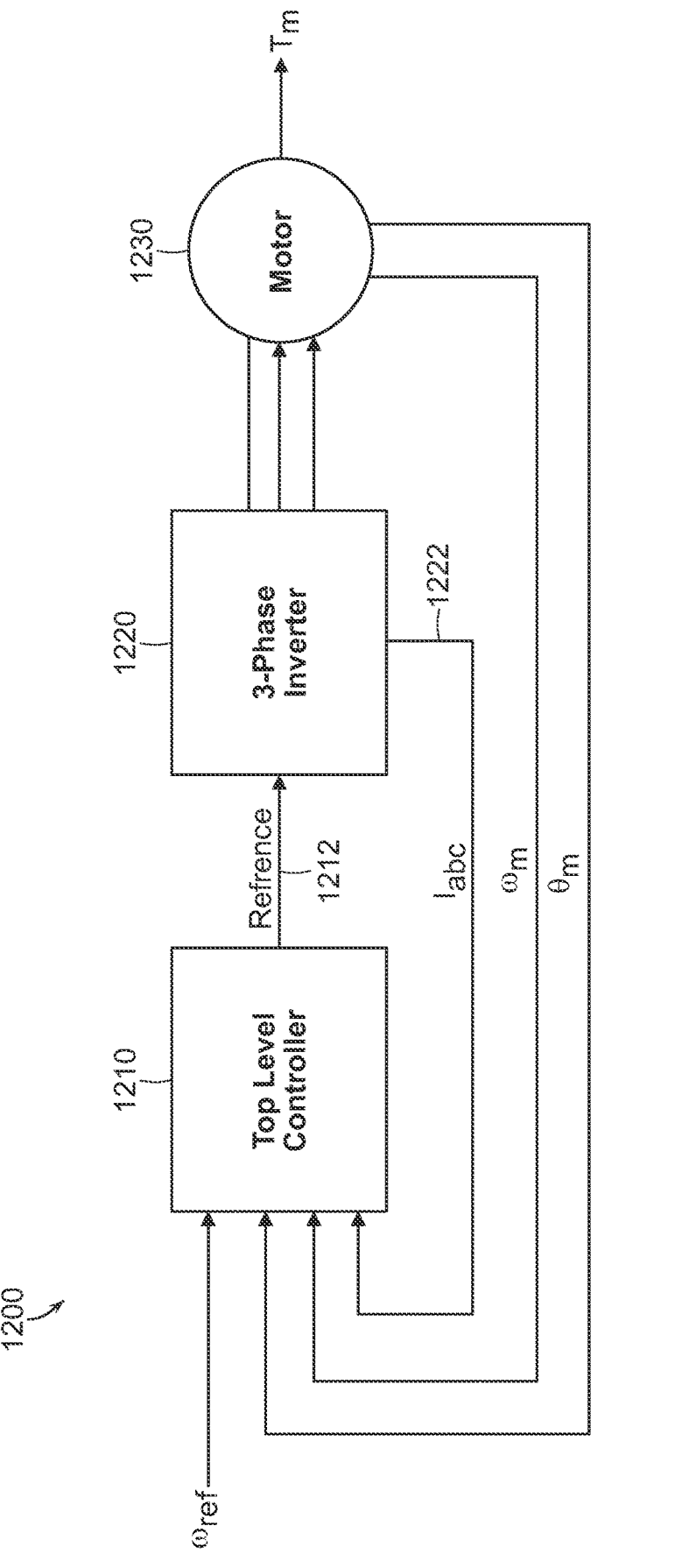
FIG. 12 is a schematic diagram of a controlled motor system with a 3-phase inverter.

In an inverter application, the stack output must be controlled to follow a sinusoidal voltage or current reference (i.e., the output of the stack is continually varied in a controlled manner to cause the operation of the connected motor). This reference may be come from a top-level stack controller, such as the controller 1010 of FIG. 10, or a controller 1210 shown in FIG. 12, which is a schematic diagram of a controlled motor system 1200 with a 3-phase inverter. As illustrated in FIG. 12, the stack controller 1210 measures the output $I_{abc}$ 1222 of the inverter 1220 (which may be configured similarly to the plurality of multi-level converters 1020, 1022, and 1024 comprising the stack of the system 1000), measures any other desired variables (such as angle θm and speed ωm) for a motor 1230, and computes (and outputs) a reference input 1212 for the stack. The stack controller also receives as input a tracked speed profile $ω_{ref}$. The reference signal 1212 may be configured to directly control only the center (output) cell. The other cells may be set, in some embodiments, set to maintain a 1:1 voltage ratio between their top and bottom capacitors. Modulating the center stage trades voltage between the middle two capacitors. These voltage changes then propagate up and down the stack as the other cells enforce the 1:1 ratio. This ensures that all the capacitors above the output share the same voltage, as do all those below the output. The conversion ratio of the stack therefore matches the conversion ratio of the center cell. The fast local feedback loops and capacitive energy storage on each cell ensure that voltage balancing is maintained through transients.

Figure 13:
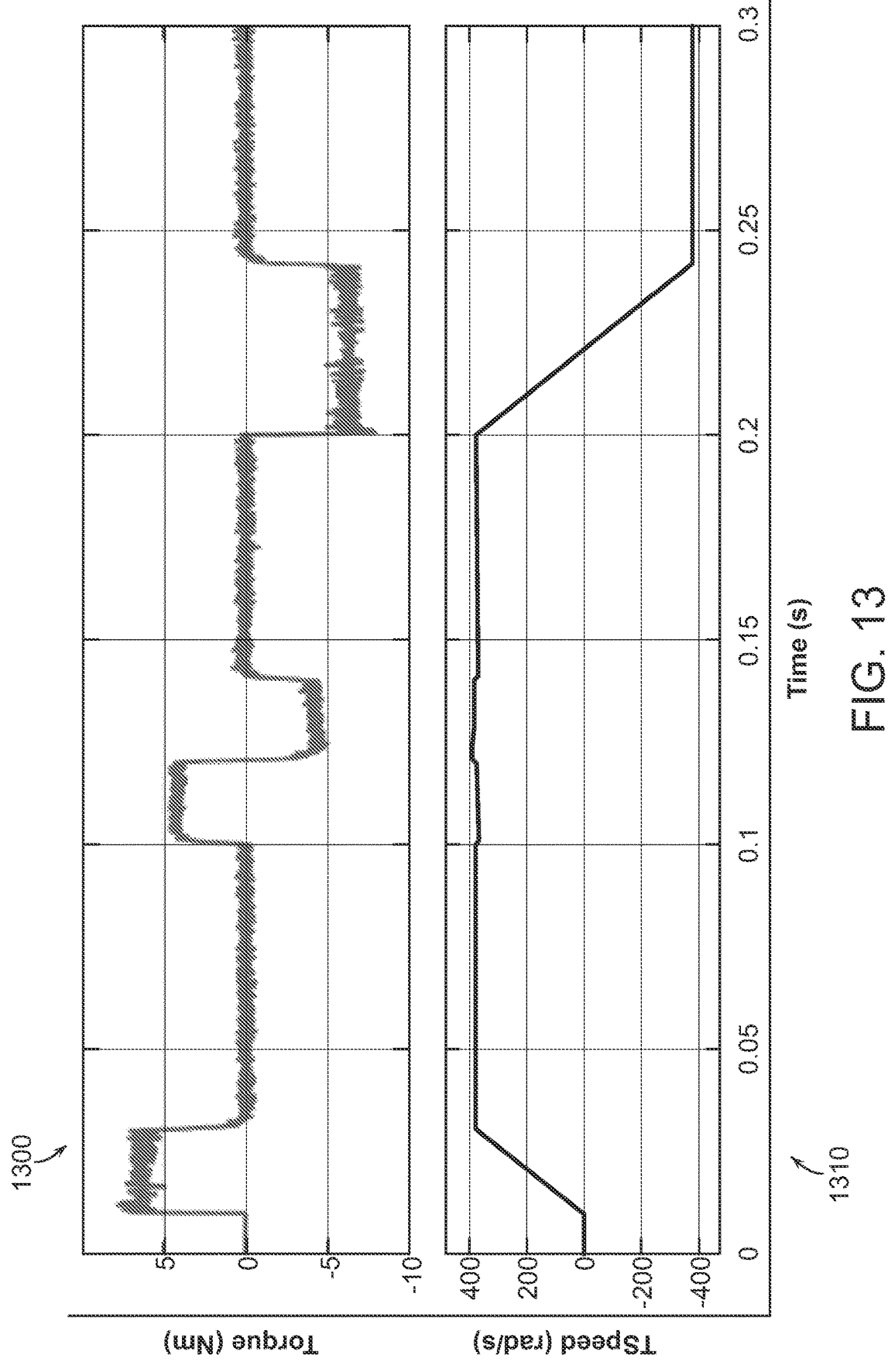
FIG. 13 includes graphs showing the motor torque and speed resulting from running a test profile on the motor configuration schematically depicted in FIG. 12.
Figure 14:
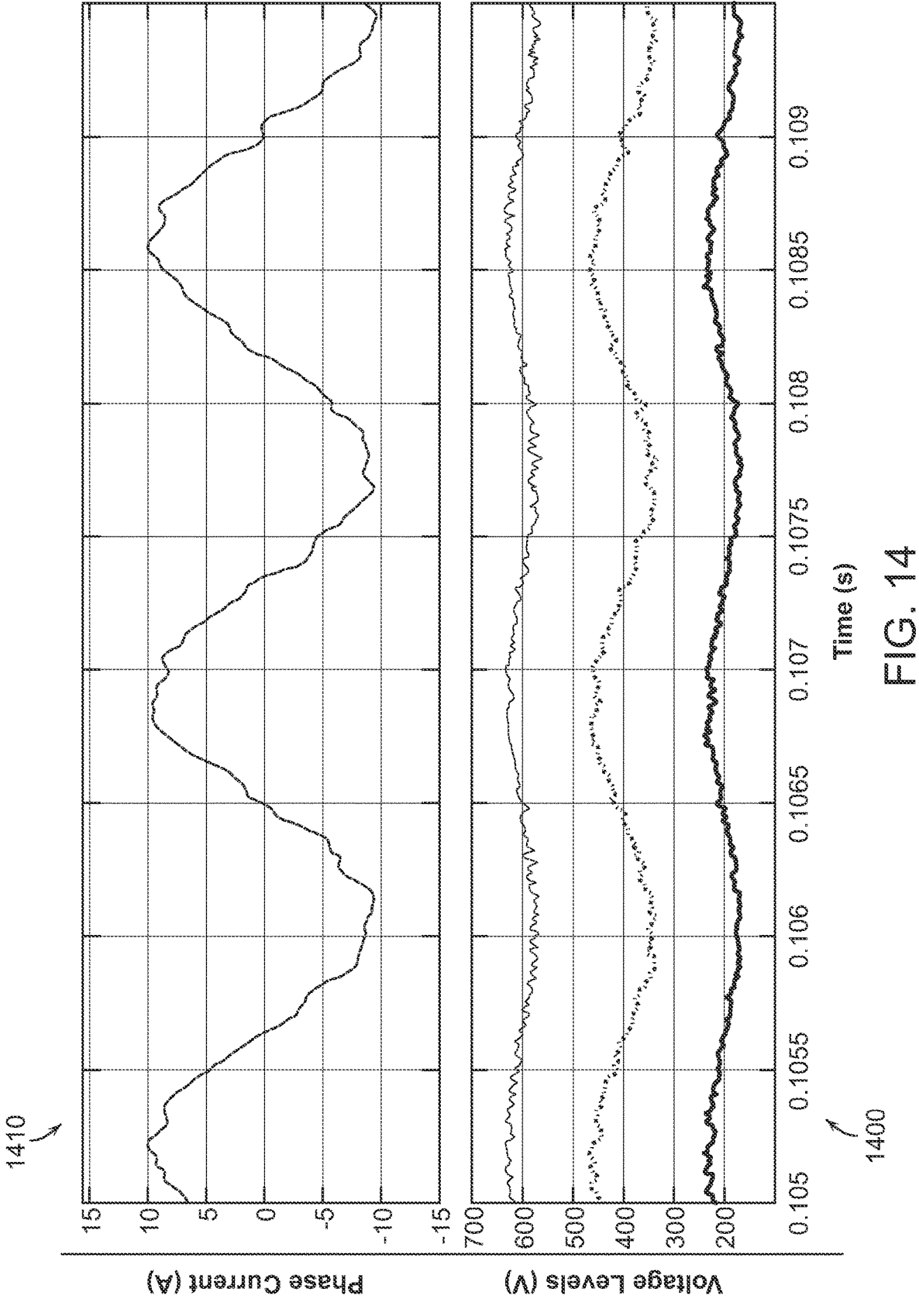
FIG. 14 includes graphs showing the three voltage levels in multi-level converter stacks used for driving a 3-phase motor.

In one embodiment, three arrangements of a 3-cell topology and a top-level controller were used to construct a three-phase motor drive, with a configuration similar to that depicted in FIG. 12. The system tracked a speed profile $\omega_{ref}$ and responded to bidirectional torque disturbances illustrated in the graphs 1300 and 1310, respectively, of FIG. 13. FIG. 14 includes graphs showing the three voltage levels (in graph 1400) in the multi-level converter stack (with three converters, each corresponding to one of the three phases driving the motor), and its output current (in graph 1410). Thus, as indicated by the results of FIGS. 13 and 14, the topology successfully produces the required waveforms, and the motor tracked the desired speed profile while rejecting the torque disturbances.

Thus, in some embodiments, the multi-level arrangement of the multiple voltage converting cells may include a plurality of voltage converting cells arranged in multiple stacks of voltage converting cells connected to a load (such as a motor, like the one shown in FIGS. 10 and 12), with the plurality of controllers including a central controller (like the central controller 1010 of FIG. 10) electrically coupled to the multiple stacks of voltage converting cells to control electrical currents produced by the multiple stacks to power the load. The load may include a multi-phase motor, with each of the multiple stacks of voltage converter cells providing a respective phased current for one of multi-phase inputs of the multi-phase motors, and with the central controller being configured to control duty cycles of one or more switching devices in the multiple stacks to produce the multi-phase currents that result in one or more of a specified motor speed or a specified motor torque. In some embodiments, the plurality of controllers may include at least one additional individual cell controller (such as the cell controller 1042 of FIG. 10; such a cell controller may be implemented as a closed-loop controller, as a processor-based controller, or some other type of controller) for at least one of the multiple voltage converting cells, with the at least one of the multiple voltage converting cells comprising two capacitors, two switching devices, and an inductor element arranged in a buck-boost converter configuration, and with the individual cell controller for the at least one of the multiple voltage converting cells being configured to maintain a ratio between a first and second voltage levels of non-common terminals of the two capacitors at a specified level. It is to be noted that in some embodiments, the controller of the voltage converter system may include individual cell controllers (or even just a single controller for one of the voltage converter cells) without using a central controller to implement joint control over the multi-level converter circuitry.

Another topology that may be used to implement multi-level converters is the Dual Active Half Bridges (DAHB) Manhattan topology. The proposed DAHB Manhattan topology uses a dual-active half bridge module, as opposed to the half-bridge (HB) modules of the generalized topology discussed in relation to FIGS. 1-14. The resulting DAHB topology requires half the number of switches and inductive components. In addition, the DAHB Manhattan converter mitigates the loop currents, and is thus a fully balanced power electronic topology that scales linearly to N levels with constant component size. It is to be noted that the proposed DAHB converter unit/cell may be used in place of the half-bridge Manhattan units used to realize the multi-level converter systems shown in FIGS. 1-14.

As will be discussed in greater detail below, regions of the Dual Active Half Bridge converter are defined by sequences of four switches that connect the circuit's capacitors through its transformer. The duty cycles of the primary and secondary sides (which are decoupled, or isolated from each other through the transformer), are controlled independently, and along with the phase shift between switching events across the primary and secondary sides, define the switching sequences. Twenty-four (24) unique switching sequences create corresponding operating regions that span the possible values of the three inputs. These regions are formed out of the six piecewise affine inequalities which emerge from the possible orderings of the switching events. Control of the switching sequences leads to arbitrary control over the energy in the four capacitors. This allows power to flow from one capacitor to another based on the switching region and key parameters such as voltage and initial transformer current. Knowledge of the switching states and the corresponding power flows in the converter can lead to more optimal designs for particular applications of the dual active half bridge.

Figure 15A:
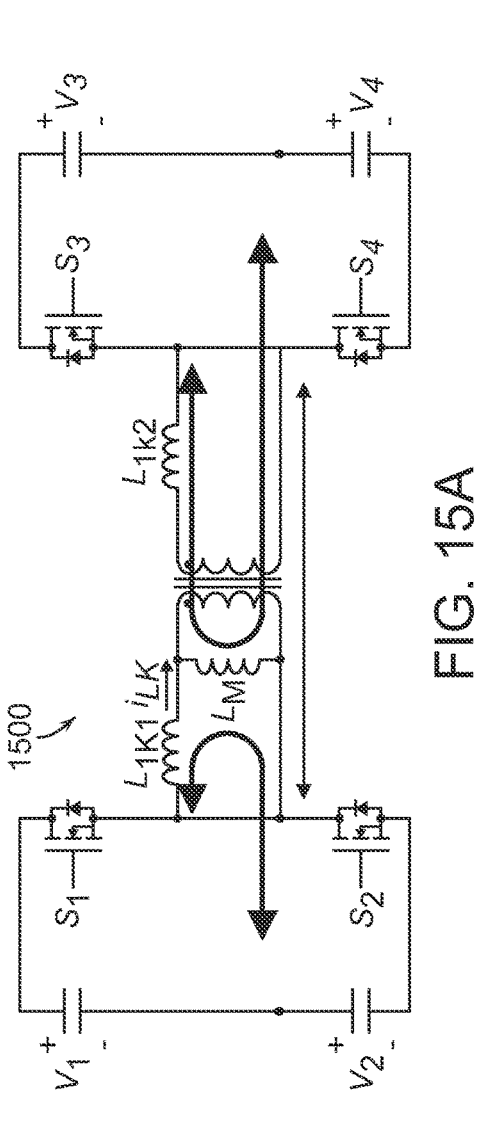
FIG. 15A is a schematic diagram of a Dual Active Half Bridge Converter (DAHB) unit/cell.

Dual Active Half Bridge Converters (DAHBs) include four capacitors paired with four switches and a high frequency transformer to connect them. FIG. 15A is a schematic diagram of a DAHB unit 1500. This configuration results in the DAHB having efficient operation and wide applications as stand-alone devices and as subcircuits in more complex circuits such as in multilevel converters. In standalone applications, they can be used in low power circuits because, for a given power, fewer switches lead to higher current per switch when compared with a full bridge. However, this does not prevent use in higher power systems. DAHBs can be used as components for electric vehicle charging circuits, in battery charging applications, microgrids, and auxiliary power sources, making them a useful tool in the effort to electrify infrastructure as a means to mitigate the worst effects of climate change.

Figure 15B:
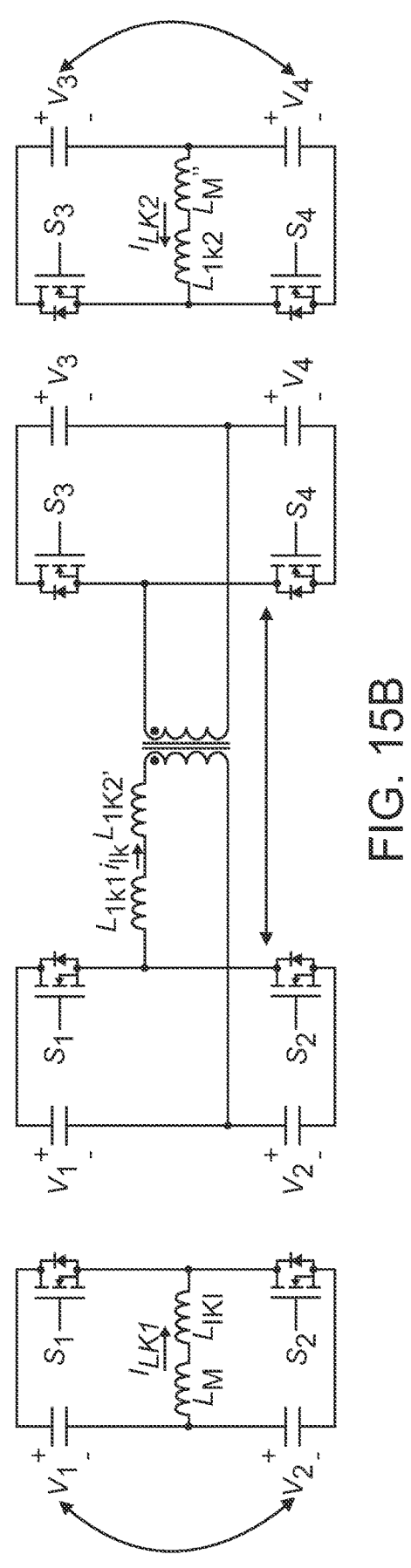
FIG. 15B includes a schematic diagram of another representation of a DAHB unit.

Power transfer between the primary and secondary sides in a DAHB is dependent on the current through the transformer leakage inductance. Control of this current is critical to managing DAHB's operation. Various control schemes based on state space modeling control the operation of a DAHB unit by controlling the duty cycles of the switches on each side of the transformer as well as the phase shift between the switches on the primary and secondary sides. The implementations proposed herein quantify the possible switching sequences of the DAHB in order to establish a model of the converter unlocking a total of three (3) degrees of freedom in which the DAHB can operate. With this new 3-dimensional DAHB (3D-DAHB) scheme, all possible orderings of switching events can be reached, allowing for selection by a controller to optimize 3D-DAHB operation. This in turns enables the movement of energy to any capacitor arbitrarily. The 3D-DAHB can be expressed as a decomposition of the DAHB circuit that includes two buck-boost converters, and a DAHB circuit, as illustrated in FIG. 15B. The switching sequences form piecewise affine inequalities in the space of the three input variables which defines a new class of control.

The 3D-DAHB configuration has many parameters that affect its operation, the most prominent of which are the voltages across the four capacitors, which are constrained by the total bus voltage. Because of the speed of the switching that occurs, typically between 100 kHz and 1 MHz, the simplifying assumption that these voltages are constant over the course of one period is made for the duration of the present analysis. The exact length of the period will also affect the amount of power transferred between the capacitors. Other relevant parameters are the leakage inductance of the transformer, and the initial leakage current at the beginning of each period. The controlled variables are the relative duty cycles of the primary and secondary side switches, $\theta_1$ and $\theta_2$, and the phase shift between the primary and secondary switching events, $\phi$. Each of these variables can be defined on a region spanning one period before they return to previously defined values. For the purposes of symmetry, all these have been defined on the region $\phi$, $\theta_1$, $\theta_2 \in [-\frac{1}{2}, +\frac{1}{2}]$.

Figure 16:
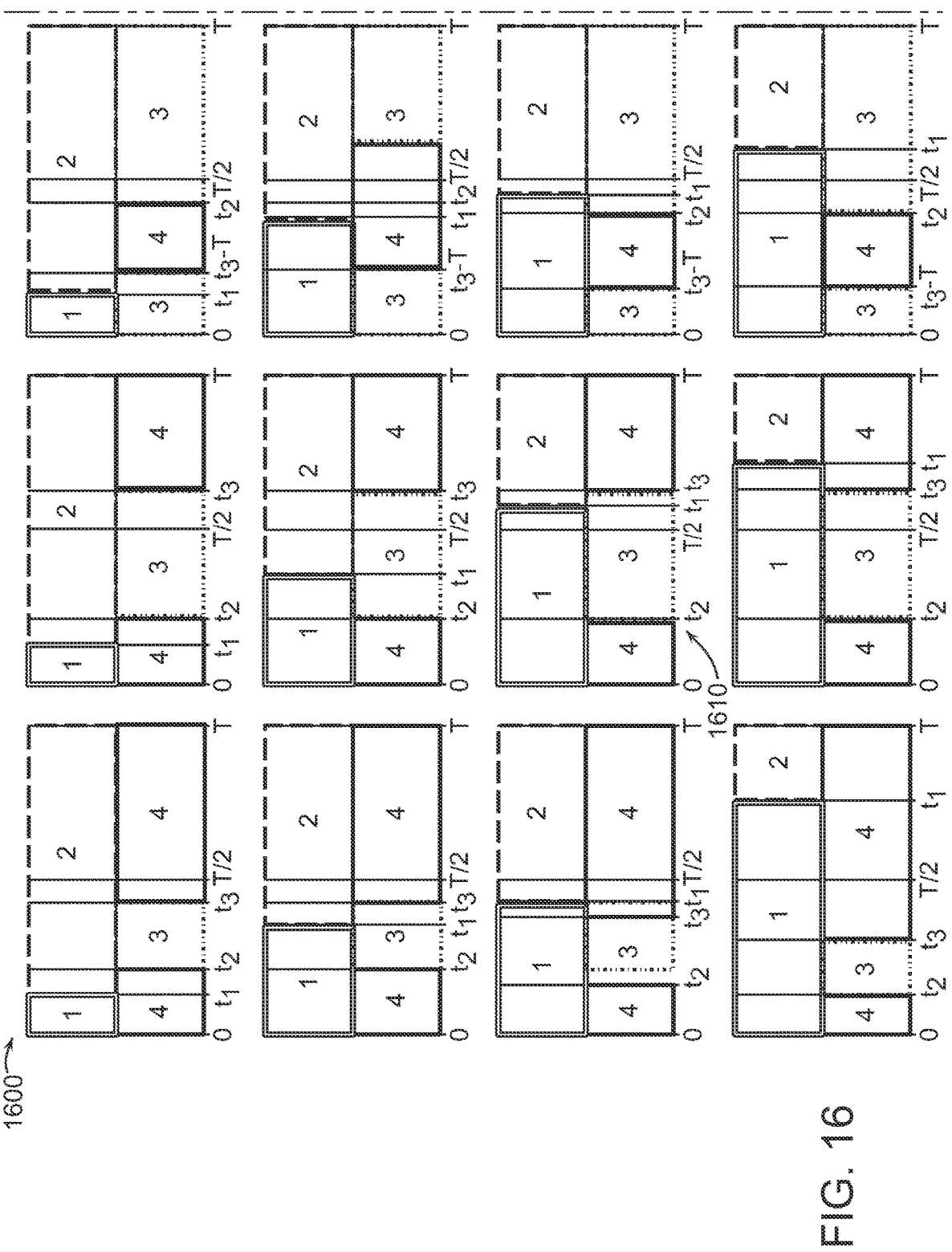
FIG. 16 is a table specifying possible switching configurations that lead to different behaviors of a DAHB unit.
Figure 16:
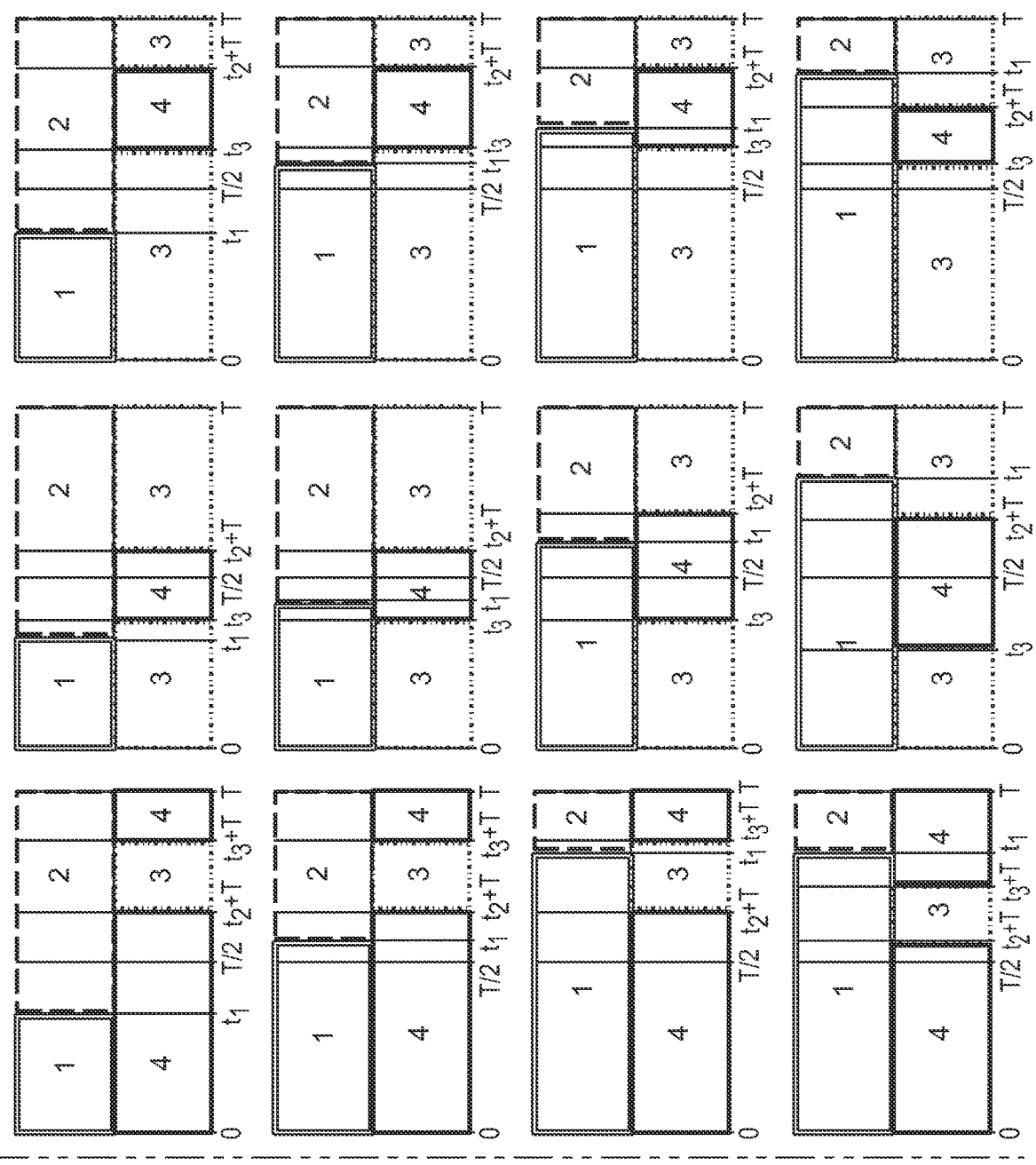

There are twenty-four (24) possible switching configurations that lead to different behaviors of the 3D-DAHB. The sequences are shown in a table 1600 FIG. 16, illustrating the twenty-four switching sequences of possible operating modes (regimes) for the 3D-DAHB configuration when controlling the duty cycles and phase shifts. The switching events are as follows: $t_1 = T(\frac{1}{2} - \theta_1)$, $t_2 = T\phi$, and $t_3 = T(\frac{1}{2} - \theta_2 + \phi)$. Because the inputs are chosen as the more important or fundamental values $\theta_1$, $\theta_2$, and $\phi$, the relevant time periods that define the switching states also include the midpoint of each period in addition to the beginning and end.

Figure 17:
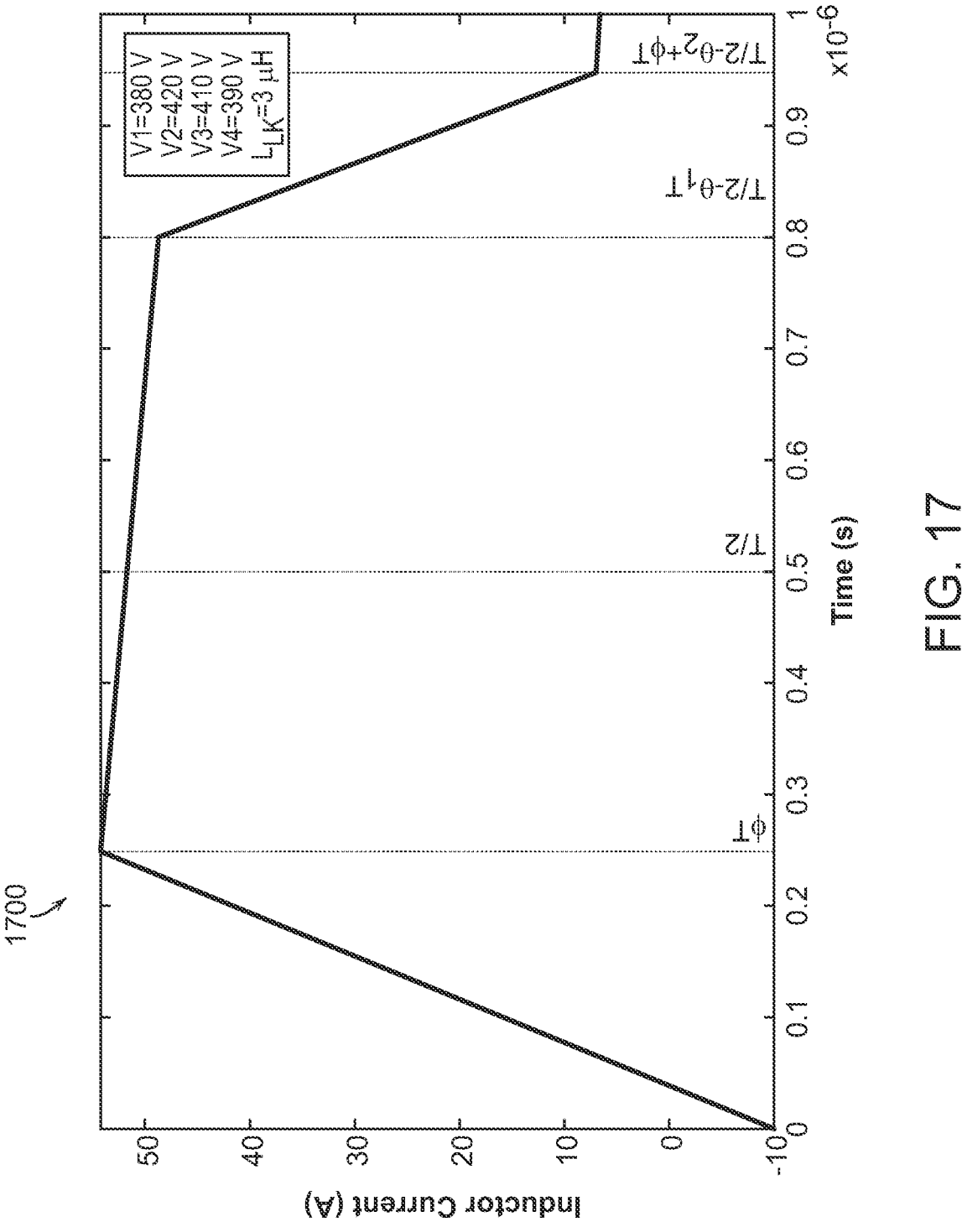
FIG. 17 includes a graph showing the leakage inductor current during one period of the switching sequence corresponding to the $3^{rd}$ row and $2^{nd}$ column of the table of FIG. 16.

The operation of any DAHB is governed by the leakage inductor current in the high frequency transformer. Using the assumptions above, and the formula for inductor current in terms of the voltage across it, the current through the inductor can be summarized as follows:

$$i_{Lk}(t) = \begin{cases} i_{LK}(0) + \int_{t_a}^{t_b} \dfrac{V_{a1} + V_{a2}}{L_{LK}} dt & 0 < t \leq t_a \\[2mm] i_{LK}(t_a) + \int_{t_a}^{t_b} \dfrac{V_{b1} + V_{b2}}{L_{LK}} dt & t_a < t \leq t_b \\[2mm] i_{LK}(t_b) + \int_{t_b}^{t_c} \dfrac{V_{c1} + V_{c2}}{L_{LK}} dt & t_b < t \leq t_c \\[2mm] i_{LK}(t_c) + \int_{t_c}^{T} \dfrac{V_{a1} + V_{a2}}{L_{LK}} dt & t_c < t \leq T \end{cases} \quad (15)$$

where the time periods and voltages in each part of the piecewise function will change depending on the switching sequence regime. The time periods $t_a$, tb, and $t_c$, will be one of $t_1$, $t_2$, or $t_3$, defined above, while the voltages will be $V_1$, $-V_2$, $V_3$, or $-V_4$. FIG. 17 includes a graph 1700 showing the leakage inductor current during one period of the switching sequence corresponding to the $3^{rd}$ row and $2^{nd}$ column of the table 1610 of FIG. 16 (indicated as entry 1610) with the relevant time intervals marked. The results of the graph 1700 were obtained with values of $\phi = 0.25$, $\theta_1 = -0.3$, and $\theta_2 = -0.2$, which were chosen to satisfy the constraints of this sequence.

Thus, the inductor current will be a piecewise linear function with four parts, whose slopes and intercepts differ among the different switching regimes. The slopes of each of the lines are dependent on the voltages on the two active capacitors in that region as well as the leakage inductance of the transformer while the intercepts are dependent on the previous value of the current. The length of each line segment depends on the particular choice switching variables $\phi$, $\theta_1$, and $\theta_2$ that satisfy the constraints of the switching sequence region. The individual capacitor currents will be a subset of between one and three parts of the total inductor current. For example, in the switching sequence of position (3,2) of table 1600, the current in capacitor one will include the current between times $(0, t_2)$ and between $(t_2, t_1)$ as shown in Equation 16 below. These currents do not necessarily have to be consecutive.

$$i_1(t) = \begin{cases} i_{Lk}(0) + \dfrac{t(V_1 + V_4)}{L_{Lk}} dt & 0 \leq t \leq t_2 \\[2mm] i_{Lk}(t_2) + \dfrac{(V_1 - V_3)(t - t_2)}{L_{LK}} dt & t_2 \leq t \leq t_1 \end{cases} \quad (16)$$

where $$i_{Lk}(t_2) = i_{Lk}(0) + \dfrac{t_2(V_1 + V_4)}{L_{Lk}}$$

is the current at time $t_2$. The capacitor currents are fully defined by the voltages, switching region, and leakage inductance, leaving the current at beginning of the period as the only variable. The constraints defining a switching sequence can be derived by expanding the natural inequalities created by the sequences of FIG. 16. These, in turn, lead to a set of inequality constraints on $\theta_1$, $\theta_2$, and $\phi$ of the form:

$$Hx \leq kx,$$

where $H \in \mathbb{R}^{6x3}$, $k \in \mathbb{R}^{6x1}$, $$x = \begin{pmatrix} \phi \\ \theta_1 \\ \theta_2 \end{pmatrix}.$$

Each switch sequence is defined by the six greater and lesser inequalities for each switching event. For example, the switching sequence for the inductor current of FIG. 17 is:

$$H = T\begin{bmatrix} -1 & 0 & 0 \\ 1 & 0 & 0 \\ -1 & -1 & 1 \\ 0 & 1 & 0 \\ 1 & 0 & -1 \\ -1 & -1 & 1 \end{bmatrix}, k = \dfrac{T}{2}\begin{bmatrix} 0 \\ 1 \\ 0 \\ 0 \\ 1 \\ 0 \end{bmatrix} \quad (17)$$

Figure 18:
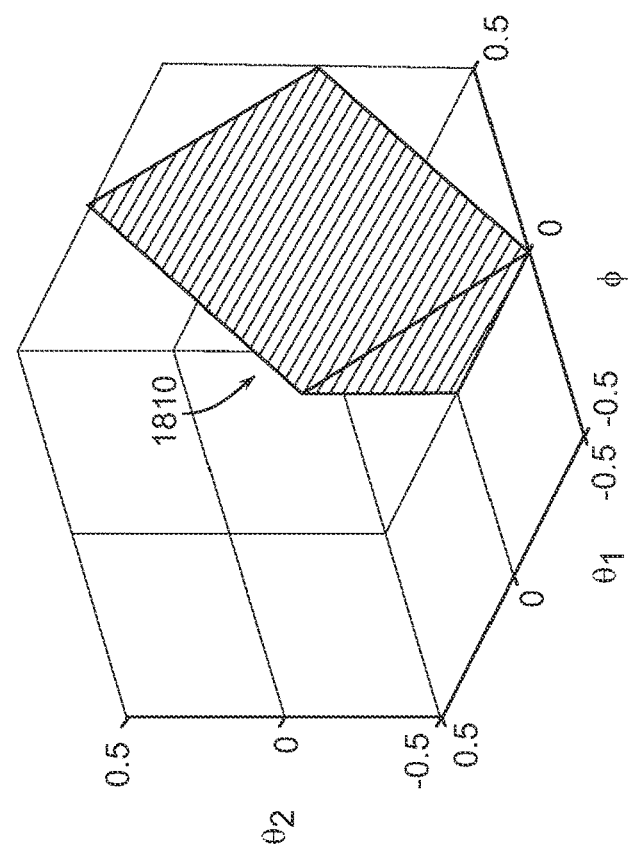
FIG. 18 includes a diagram showing the switching sequence regions forming a convex, nonoverlapping union spanning $\pm\frac{1}{2}$ on each of the axes, and a diagram showing the sequence region corresponding to the position (3,2) of the table of FIG. 16.
Figure 18:
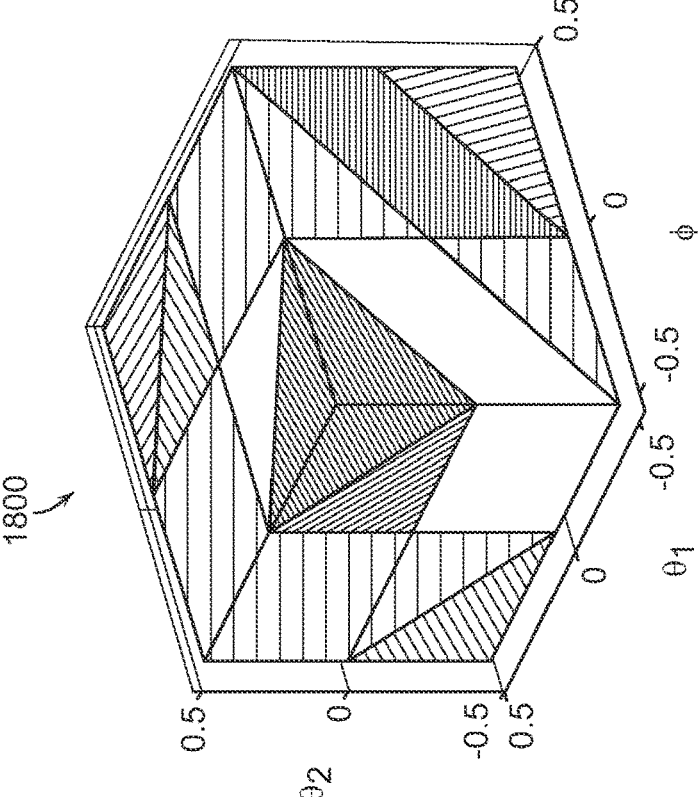

The H and k matrices can be created for each of the 24 switching sequences. Each of the sequences now represents a piecewise affine region in the space formed by the $\theta 1$, $\theta_2$, and $\phi$ axes. These 24 regions are shown together in FIG. 18, providing a diagram 1800 showing all of the switching sequence regions forming a convex, nonoverlapping union spanning $\pm\frac{1}{2}$ on each of the axes. Diagram 1810 of FIG. 18 shows the sequence region corresponding to the position (3,2) of the table 1600 of FIG. 16. The regions are thus unique and cover all possible values in their definitions.

The average power in capacitor k can be calculated by multiplying the voltage across the capacitor, which is constant over a single period, by the average current through that capacitor. The general case is given as $$P_{k,avg} = (V_k)\left(\dfrac{1}{T}\int_0^T i_k(t)dt\right) \quad (18)$$

Using k=1 and Equation 16 above, the resulting power for the first capacitor in switching sequence (3,2) is:

$$P_{1,avg} = \dfrac{\begin{array}{c} V_1(2L_{Lk}i_{lk0}t_2 + (t_1 - t_2)(2L_{Lk}i_{lk0} + V_1t_1 + \\ V_1t_2 - V_3t_1 + V_3t_2 + 2V_4t_2) + t_2^2(V_1 + V_4)) \end{array}}{2L_{Lk}T} \quad (19)$$

Similar equations can be derived for each capacitor in each switching region. This outlines a total of 96 similar equations to fully define all possible capacitor powers in the 3D-DAHB.

Despite the high number of equations, several practical simplifications can be made in order to develop a controller. The first is to restrict operation of 3D-DAHB to one switching region at a time, which ensures only four equations are relevant at a time; transitions between regions can occur smoothly allowing for a controller to recognize and adapt to the appropriate region. In some embodiments, a state space piecewise affine model to control power flows may be developed.

Figure 19:
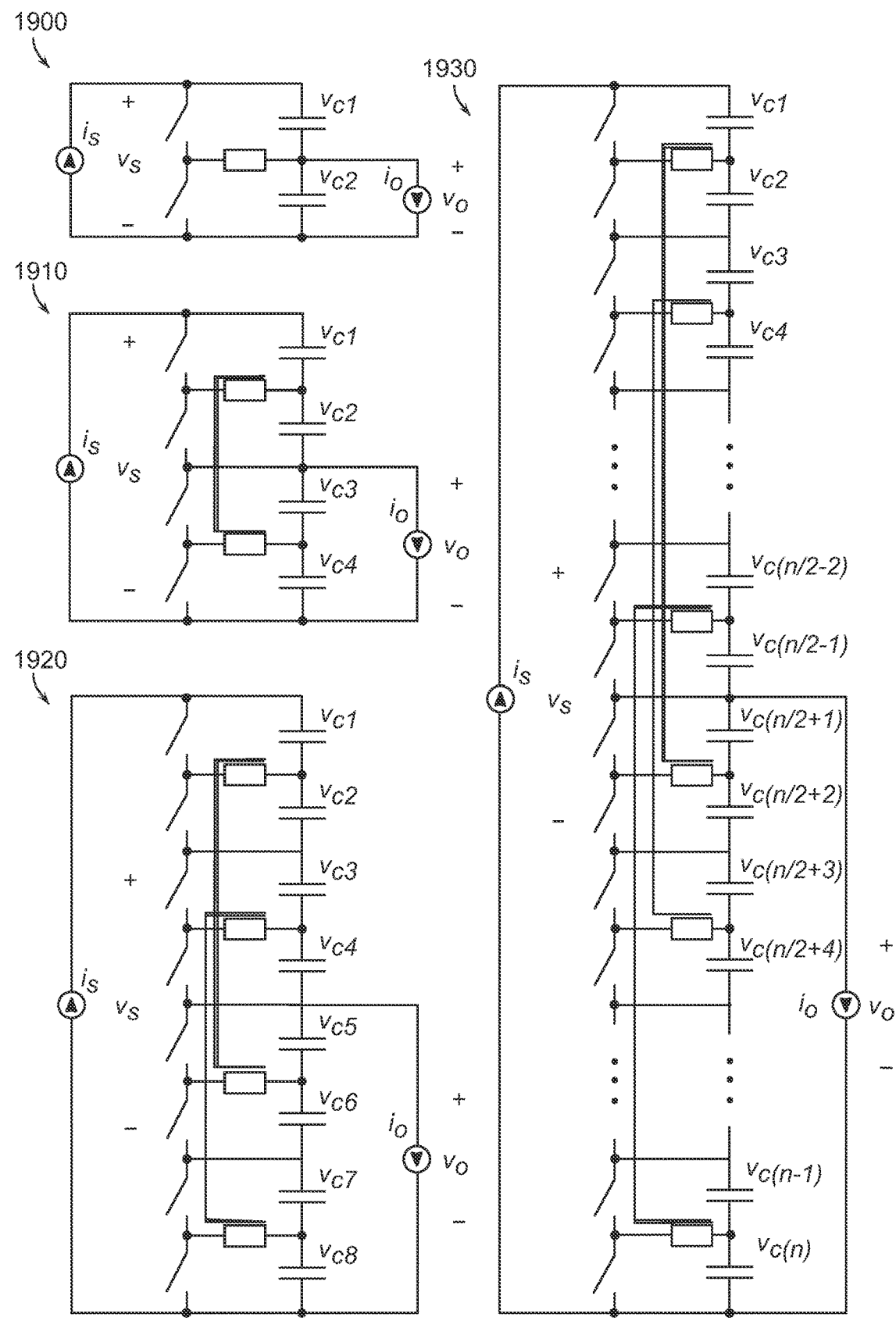
FIG. 19 includes circuit diagrams for the DAHB Manhattan converter topologies for n (number of levels)=2, 4, 8, and 2 N.

Next, multi-level converter topologies based on the above-described controllable DAHB unit are described. The generalized topology for the DAHB Manhattan converter is shown in FIG. 19, where n represent the number of levels and number of stackable unit cells. Four different DAHB converters are depicted in FIG. 19, including a 2-level converter 1900, a 4-level (n=4) converter 1910, an 8-level (n=8) converter 1920, and a $2^N$-level converter 1930. The circuit topology is capable of bidirectionally converting DC/DC or DC/AC and can be configured also in parallel. For the sake of brevity, the topologies depicted in FIG. 19 implement a multilevel phase leg, i.e., a step-down buck configuration that generates an output voltage $v_o(t)$ from a source voltage $v_s(t)$. The output voltage is time varying and can be a DC or AC signal that satisfies $v_o(t) \in [\mathbf{0}, v_s(t)]$.

Figure 20:
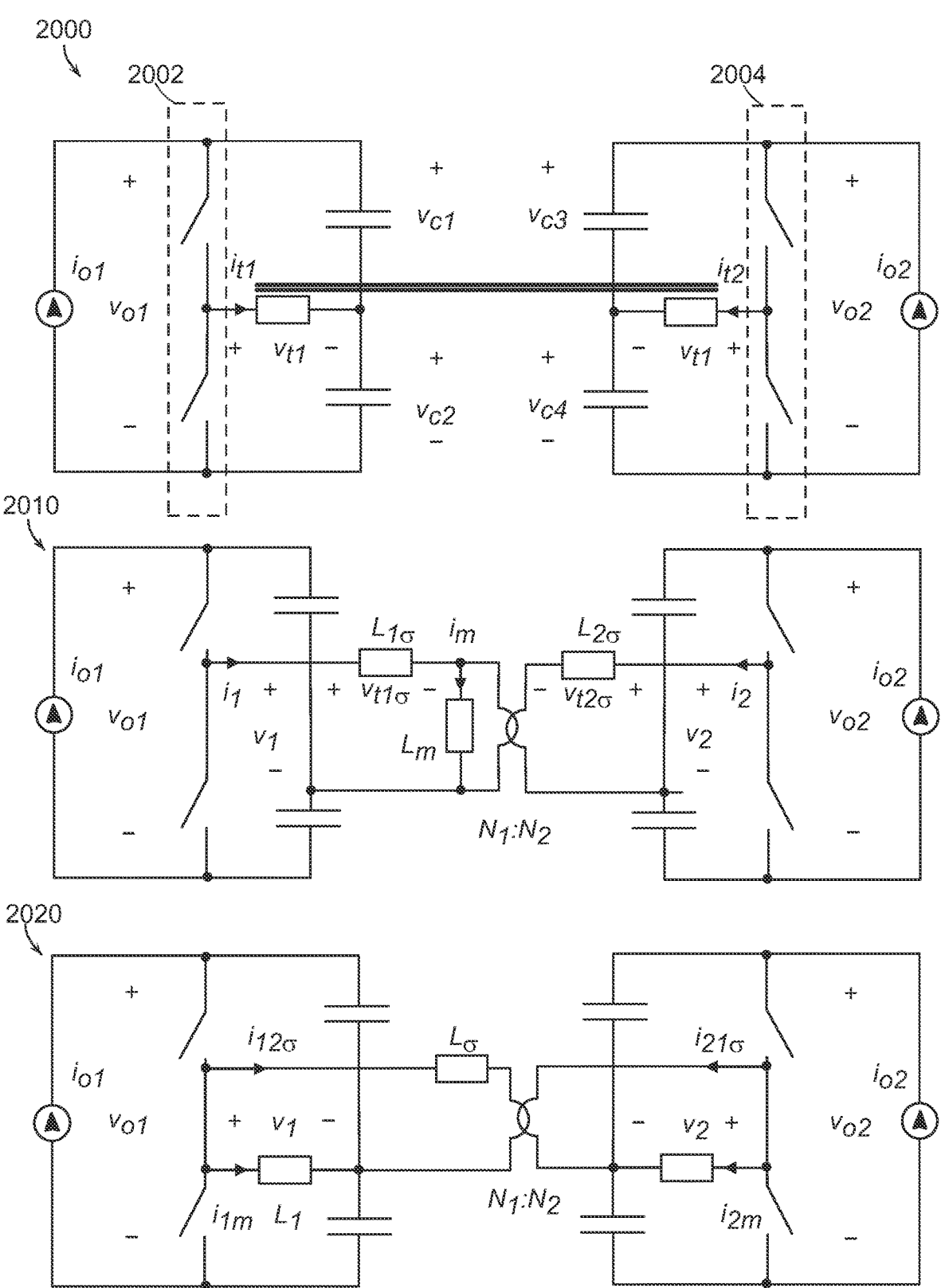
FIG. 20 includes circuit diagrams of example stackable DAHB units/cells.

Example stackable unit cells 2000, 2010, and 2020 that comprise a DAHB multilevel topology are shown in FIG. 20 (the stackable cells/units of FIG. 20 may be similar to the units of FIGS. 15A and B). The DAHB configurations of the unit cells 2010 and 2020 include a T-transformer model and a π-transformer model, respectively. The 3D DAHB stackable unit cells of FIG. 20 can move power from and to any capacitor independently by acting on the three control variables: the phase shift between the primary and secondary side pulse-width modulation (PWM) signal θ, the duty cycle of the primary PWM signal $d_1(t)$, and the duty cycle of the secondary side PWM signal $d_2(t)$. The PWM-related signals control and actuate the various switches included with each of the individual cell units. For example, actuating signals are produced by a controller (not shown), which may be a close-loop controller, based on electrical properties (e.g., current and voltages) measured/sensed in the circuitry of the individual cell 2000 and the desired electrical behavior of the individual cell, to controllably actuate one or more of the switches of the primary side 2002 switches, and controllably actuate secondary side 2004 switches. Current flows through each unit cell in the same way it does in a typical inverting buck-boost converter. Hence, this topology has three degrees of freedom and can set three capacitor voltages independently. The fourth capacitor voltage generally results from a boundary constraint such as the source voltage.

The stacked cell nature of this topology eliminates the need for a bulk capacitance between the input/output nodes to reference as the series combination of the cell capacitances serves to support both the input and output nodes as well as the voltages within each cell. Individual capacitor voltages can be controlled as a function of the duty cycles of each unit cell, allowing for the voltage across the entire stack to be balanced across each cell to any arbitrary ratio. This enables the control of voltages higher than the voltage rating of any individual semiconductor or passive component. As the output voltage is simply the sum of the capacitor voltages between the output node and reference, the ability to balance the capacitor voltages to any arbitrary ratio also allows for the output voltage to swing between full input voltage and reference.

For the n-level converters shown in FIG. 19, the voltage at any node along the center capacitor stack can be determined according to the equations $$\frac{dv_{cj}(t)}{dt} = \begin{cases} i_{cj(t)} + i_s(t) \, | & j < n/2 \\ i_{cj(t)} + i_s(t) - i_o(t) \, | & j > n/2 \end{cases} \tag{20}$$

where $v_{cj}$ are the capacitor voltages for a specific capacitor j, $i_{cj}$ is the current moved by the 3D-DAHB to that specific capacitor, and j=1, . . . , n identifies the capacitors.

It is generally assumed that either the source voltage or the output voltage is given, and the other voltage is the target voltage that is set by the converter. The former case identifies a multilevel buck converter case and the latter case identifies a multilevel boost. In both cases, the output (and input) can be a DC signal or an AC signal with DC offset. Since it is common to operate on a stabilized DC bus, consider this use case that imposes the boundary condition:

$$v_s(t) = \sum_{j=1}^{n} v_{cj}(t) = V_s \tag{21}$$

Similarly, the output voltage is defined as:

$$v_o(t) = \sum_{j=n/2}^{n} v_{cj}(t) \tag{22}$$

Therefore, the Manhattan converter changes the output voltage by moving charge from the capacitors below the output node to the capacitors above that node and vice versa. Even in steady state conditions, the 3D-DAHB move current such that $$\frac{dv_{cj}(t)}{dt} = 0A \Leftrightarrow \begin{cases} i_{cj(t)} + i_s(t) = 0A \, | & j < n/2 \\ i_{cj(t)} + i_s(t) - i_o(t) = 0A \, | & j > n/2 \end{cases} \tag{23}$$

It is noted that in contrast to the HB Manhattan converter (discussed in relation to FIGS. 1-9), the DAHB Manhattan converter is a point-to-point conversion system as opposed to a semi-cascade. Therefore, the overall converter efficiency is the same as the efficiency of the DAHB modules.

Figure 21A:
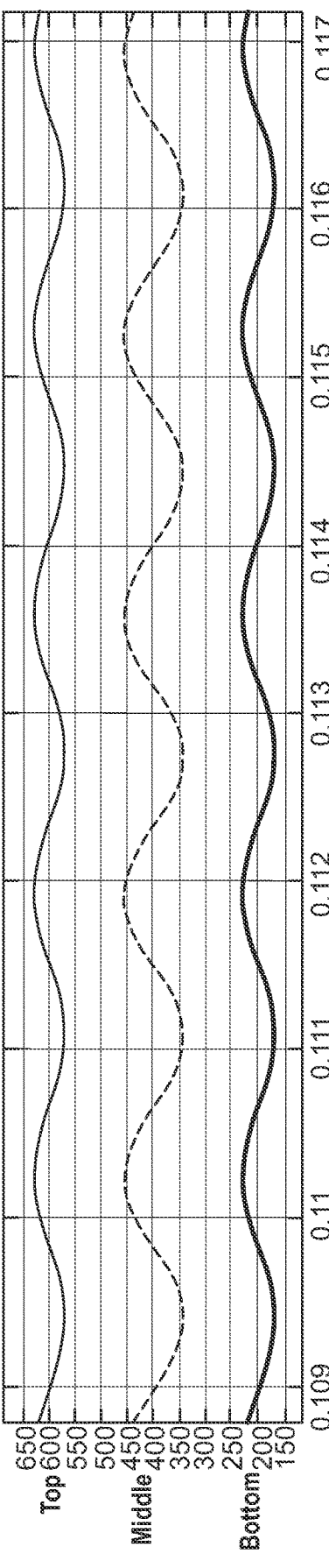
FIGS. 21A-B includes graphs for current waveforms for an N=4 DAHB Manhattan topology in inverter operation driving a 3-phase motor, and graphs for the resultant toque, speed, and angle behavior for the 3-phase motor.
Figure 21B:
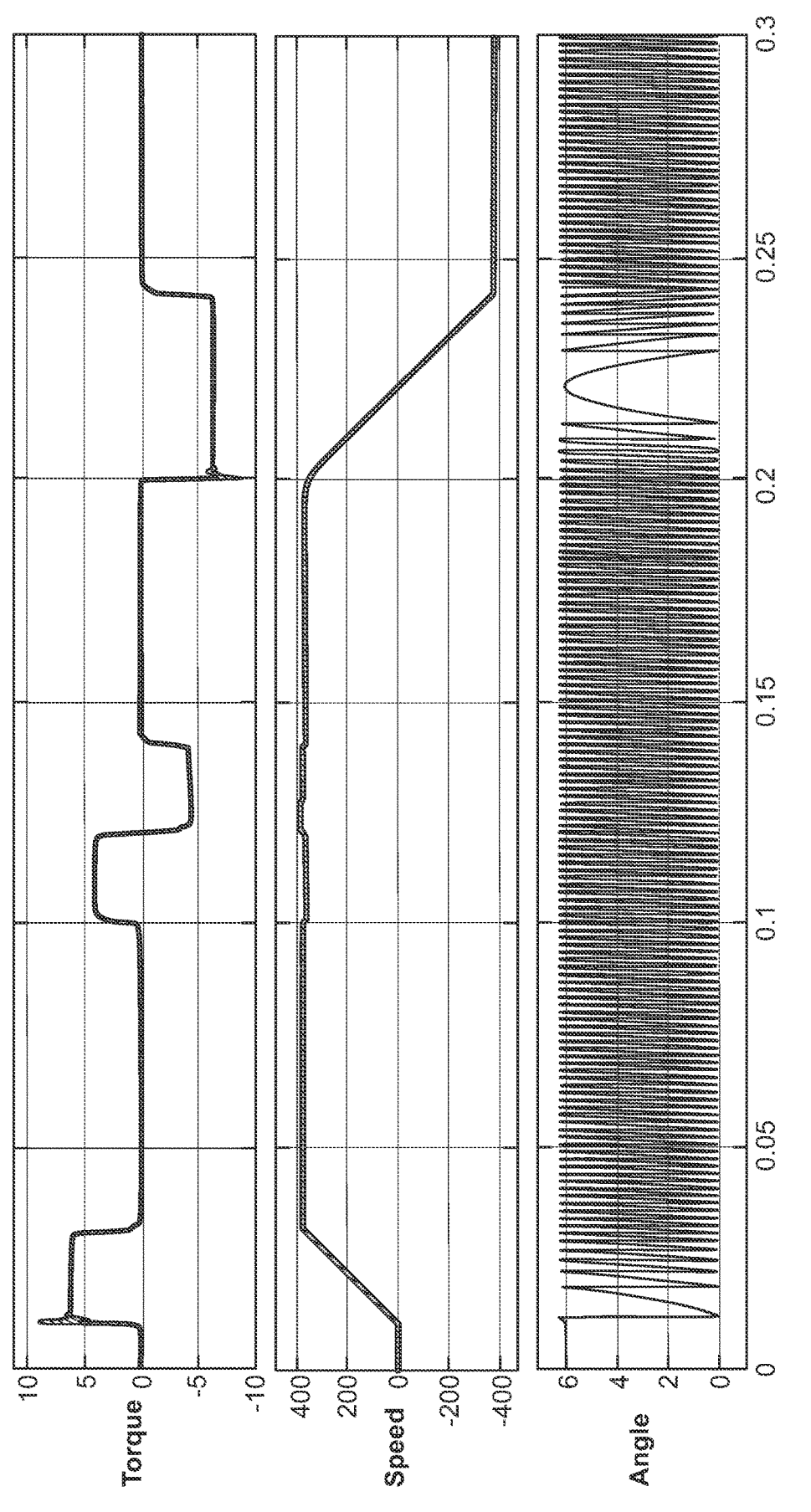

The DAHB Manhattan converter was validated for a three-phase motor drive inverter. The N=4 converter 1910 shown in FIG. 19 was put in parallel on the DC site. Then, the output of each phase was connected to a motor terminal. The converter uses the same capacitor and leakage inductor values of C=10 µF and L=4.511H. The switches were considered to be ideal and synchronized within one DAHB. $V_s$ was set to 800V, $I_{out}$=10A, and $F_{sw}$=50 kHz. The Manhattan three-phase inverter was connected to a PMSM motor with 10 poles, 0.4Ω stator resistance, 10.5 mH and 12 mH d-axis and q-axis inductance, respectively, and 0.35V, permanent magnet rotor flux. The configuration used a higher-level motor control that communicates desired capacitor voltages and currents to the lower level controllers in the 3D-DAHB. The motor control included an inner PMSM vector control to control stator current and torque as well as an outer speed controller. The Manhattan three-phase inverter drove a motor from standstill to 400 rpm, maintained the speed, and then reverses the speed to −400 rpm. During the 400 rpm period, a positive and negative 4 Nm load torque step was applied. FIGS. 21A-B includes graphs showing the results of the validation experiment for the DAHB Manhattan topology in the inverter operation driving the 3-phase motor. Specifically, FIG. 21A includes a graph illustrating current waveforms of the N=4 DAHB Manhattan topology in inverter operation driving a 3-phase motor, and FIG. 21B includes graphs for the resultant toque, speed, and angle behavior for the 3-phase motor.

Thus, in some embodiments, at least one of the multiple voltage converting cells may include a Dual Active Half Bridge (DAHB) converter configuration cell that includes a primary side and a secondary side separated from the primary side by a transformer (as shown, for example, in FIGS. 15A and 15B), with the primary side including one or more primary side energy storage elements and one or more primary side switches, and with the secondary side including one or more secondary side energy storage elements and one or more secondary side switching devices.

The at least one DAHB converter configuration cell may include two primary side capacitors, two primary side controllable switching devices, two secondary side capacitors, and two secondary side switching devices (as illustrated in FIG. 20, for example). In such embodiments, the plurality of controllers configured to independently control the voltage levels of the at least one energy storage element of each of the multiple voltage converting cells may be configured to controllably actuate the two primary side switching devices and the two secondary side switching devices according to one or more pre-determined switching sequences defined for a particular time interval. The one or more switching sequences for the at least one DAHB converter configuration cell is defined by duty cycles for the primary side and for the secondary side, and by a phase shift, $\phi$, between a primary side and a secondary side switching events.

In some examples, the multiple voltage converting cells may each include a respective cell with the DAHB converter configuration cell, and the multiple voltage converting cells may be arranged as one or more stacked cascades of the cells with the DAHB converter configuration cell connected to a load. For example, the individual voltage converter cells/ units depicted in FIGS. 1, 3-6, etc. (where the cells include non-decoupled buck-boost circuits) can be supplanted by the DAHB cell configuration discussed in relation to FIGS. 15-22 herein.

With reference next to FIG. 22, a flowchart of an example voltage conversion procedure 2200 that is based on the topologies and various implementations described herein is shown. The procedure 2200 includes obtaining 2210 electrical properties data representative of electrical properties of a voltage converter system comprising a plurality of energy storage elements and a plurality of switching devices, with each of the plurality of switching devices being in electrical communication with at least one of the plurality of the energy storage elements, and with the plurality of energy storage elements and the plurality of switching devices being configured in a multi-level arrangement of multiple voltage converting cells. For example, each of the multiple voltage converting cells may include an arrangement of two capacitors and an inductor that define a buck-boost converter circuit. The electrical properties data may be obtained by measuring currents and voltages at various points of the voltage converter system (using one or more current or voltage sensors deployed at such various points of the voltage converter system), and digitizing the measurements (through analog-to-digital converters, or ADC's).

The procedure 2200 further includes controllably actuating 2220 by a plurality of controllers coupled to the multiple voltage converting cells, based at least in part on the electrical properties data, one or more of the plurality of the switching devices to independently control voltage levels of at least one energy storage element of the multiple voltage converting cells.

In some examples, controllably actuating the one or more of the plurality of switching devices may include independently controlling the voltage levels of the at least one energy storage element of each of the multiple voltage converting cells to achieve a voltage balance for the multiple voltage converting cells. Controllably actuating the one or more of the plurality of switching devices may include controllably actuating the one or more of the plurality of switching devices according to a voltage level measured across at least one of the plurality energy storage elements. In some embodiments, controllably actuating the one or more of the plurality of switching devices may include determining an adjustable duty cycle behavior for at least one of the multiple voltage converting cells. In such embodiments, determining the adjustable duty cycle behavior for the at least one of the multiple voltage converting cells may include continually (e.g., continuously or intermittently, at regular or irregular time intervals) computing the duty cycle behavior for the at least one of the multiple voltage converting cells that achieves a pre-determined output voltage for the voltage converter system, with other of the multiple voltage converting cells, excluding the at least one of the multiple voltage converting cells, configured with respective substantially fixed duty cycle values. In some embodiments, determining the adjustable duty cycle behavior for the at least one of the multiple voltage converting cells may include deriving duty cycle characteristics for the multiple voltage converting cells to achieve a desired output voltage for the voltage converter system that optimizes one or more objective functions. In such embodiments, the one or more objective functions may include one or more of, for example, a) 1-norm objective function of all inductor currents in the voltage converter system to minimize overall current rating of the voltage converter system, b) a 2-norm squared objective function of all the inductor currents of the voltage converter system to minimize overall power loss in the voltage converter system, and/or c) an inf-norm objective function of all the inductor currents of the voltage converter system to minimize maximum currents levels in all the inductor currents.

As noted, in some embodiments, at least one of the multiple voltage converting cells may include a Dual Active Half Bridge (DAHB) converter configuration cell that includes a primary side and a secondary side separated from the primary side by a transformer, with the primary side including one or more primary side energy storage elements and one or more primary side switches, and with the secondary side including one or more secondary side energy storage elements and one or more secondary side switching devices. For example, the at least one DAHB converter configuration cell includes two primary side capacitors, two primary side controllable switching devices, two secondary side capacitors, and two secondary side switching devices. In such examples, controllably actuating the one or more of the plurality of switching devices may include controllably actuating the two primary side switching devices and the two secondary side switching devices according to one or more pre-determined switching sequences defined for a particular time interval.

The one or more switching sequences for the at least one DAHB converter configuration cell may be defined by duty cycles for the primary side and for the secondary side, and by a phase shift, $\phi$, between a primary side and a secondary side switching events. The multi-level arrangement of the multiple voltage converting cells comprises a plurality of voltage converting cells arranged in multiple stacks of voltage converting cells connected to a load. In such situations, controllably actuating the one or more of the plurality of the switching devices may include controlling, by a central controller (such as the central controller shown in FIG. 10), electrical currents produced by the multiple stacks to power the load. The load may include a multi-phase motor, with each of the multiple stacks of voltage converter cells providing a respective phased current for one of multi-phase inputs of the multi-phase motors. Controlling, by the central controller, the electrical currents produced by the multiple stacks may include, in such situations, controlling duty cycles of one or more switching devices in the multiple stacks to produce the multi-phase currents that result in one or more of a specified motor speed or a specified motor torque. Controllably actuating the one or more of the plurality of switching devices may further include controlling individually, by a dedicated cell controller for at least one of the multiple voltage converting cells, the at least one of the multiple voltage converting cells (the dedicated cell controller may be a processor-based device, a close-loop controller, or some other type of control mechanism) that includes two capacitors, two switching devices, and an inductor element arranged in a buck-boost converter configuration, to maintain a ratio between a first and second voltage levels of non-common terminals of the two capacitors at a specified level.

In some embodiments, the multi-level arrangement of the multiple voltage converting cells may include a plurality of voltage converting cells arranged in multiple stacks of voltage converting cells connected to a load, with each of the multiple voltage converting cell including a dedicated cell controller. Controllably actuating the one or more of the plurality of the switching devices may include controllably actuating, by the respective dedicated cell controller for the each of the multiple voltage converting cells, the one or more of the plurality of the switching devices to independently control voltage levels of the at least one energy storage element of the multiple voltage converting cells.

Performing the various techniques and operations described herein (including the control procedure 2200) may be facilitated by a controller device (e.g., a processor-based computing device). Such a controller device may include a processor-based device such as a computing device, and so forth, that typically includes a central processor unit or a processing core. The device may also include one or more dedicated learning machines (e.g., neural networks) that may be part of the CPU or processing core. In addition to the CPU, the system includes main memory, cache memory and bus interface circuits. The controller device may include a mass storage element, such as a hard drive (solid state hard drive, or other types of hard drive), or flash drive associated with the computer system. The controller device may further include a keyboard, or keypad, or some other user input interface, and a monitor, e.g., an LCD (liquid crystal display) monitor, that may be placed where a user can access them.

The controller device is configured to facilitate, for example, the implementation of a multilevel voltage converter (e.g., by controlling the switching devices of the system). The storage device may thus include a computer program product that when executed on the controller device (which, as noted, may be a processor-based device) causes the processor-based device to perform operations to facilitate the implementation of procedures and operations described herein. The controller device may further include peripheral devices to enable input/output functionality. Such peripheral devices may include, for example, flash drive (e.g., a removable flash drive), or a network connection (e.g., implemented using a USB port and/or a wireless transceiver), for downloading related content to the connected system. Such peripheral devices may also be used for downloading software containing computer instructions to enable general operation of the respective system/device. Alternatively and/or additionally, in some embodiments, special purpose logic circuitry, e.g., an FPGA (field programmable gate array), an ASIC (application-specific integrated circuit), a DSP processor, a graphics processing unit (GPU), application processing unit (APU), etc., may be used in the implementations of the controller device. Other modules that may be included with the controller device may include a user interface to provide or receive input and output data. The controller device may include an operating system.

Computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any non-transitory computer program product, apparatus and/or device (e.g., magnetic discs, optical disks, memory, Programmable Logic Devices (PLDs)) used to provide machine instructions and/or data to a programmable processor, including a non-transitory machine-readable medium that receives machine instructions as a machine-readable signal.

In some embodiments, any suitable computer readable media can be used for storing instructions for performing the processes/operations/procedures described herein. For example, in some embodiments computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as flash memory, electrically programmable read only memory (EPROM), electrically erasable programmable read only Memory (EEPROM), etc.), any suitable media that is not fleeting or not devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although particular embodiments have been disclosed herein in detail, this has been done by way of example for purposes of illustration only, and is not intended to be limiting with respect to the scope of the appended claims, which follow. Features of the disclosed embodiments can be combined, rearranged, etc., within the scope of the invention to produce more embodiments. Some other aspects, advantages, and modifications are considered to be within the scope of the claims provided below. The claims presented are representative of at least some of the embodiments and features disclosed herein. Other unclaimed embodiments and features are also contemplated.

What is claimed is:

1. A voltage converter system comprising:
a plurality of energy storage elements;
a plurality of switching devices, each in electrical communication with at least one of the plurality of the energy storage elements, wherein the plurality of energy storage elements and the plurality of switching devices are configured in a multi-level arrangement of multiple voltage converting cells; and
a plurality of controllers to controllably actuate one or more of the plurality of switching devices to independently control voltage levels of at least one energy storage element of the multiple voltage converting cells.

2. The voltage converter system of claim 1, wherein each of the multiple voltage converting cells comprises an arrangement of two capacitors and an inductor that define a buck-boost converter circuit.

3. The voltage converter system of claim 1, wherein the multiple voltage converting cells are arranged as one or more stacked cascades of converting cells, with each voltage converting cell in the one or more stacked cascades of conversion cells sharing at least one capacitor element with a neighboring voltage converting cell.

4. The voltage converter system of claim 1, wherein the plurality of controllers configured to independently control the voltage levels of the at least one energy storage element of each of the multiple voltage converting cells is configured to achieve a voltage balance for the multiple voltage converting cells.

5. The voltage converter system of claim 1, wherein the plurality of controllers, configured to independently control the voltage levels of the at least one energy storage element of the each of the multiple voltage converting cells, is configured to determine and maintain at least one capacitor of the multiple voltage converting cells at a respective voltage level.

6. The voltage converter system of claim 1, wherein the plurality of controllers configured to controllably actuate the one or more of the plurality of switching devices is configured to controllably actuate the one or more of the plurality of switching devices based at least in part on measured electrical properties of at least one of the multiple voltage converting cells.

7. The voltage converter system of claim 6, wherein the plurality of controllers is configured to actuate the one or more of the plurality of switching devices according to a voltage level measured across at least one of the plurality energy storage elements.

8. The voltage converter system of claim 1, wherein the plurality of controllers configured to controllably actuate the one or more of the plurality of switching devices includes at least one controller configured to determine an adjustable duty cycle behavior for at least one of the multiple voltage converting cells.

9. The voltage converter system of claim 8, wherein the at least one controller configured to determine the adjustable duty cycle behavior for the at least one of the multiple voltage converting cells is configured to continually compute the duty cycle behavior for the at least one of the multiple voltage converting cells that achieves a pre-determined output voltage for the voltage converter system, with other of the multiple voltage converting cells, excluding the at least one of the multiple voltage converting cells, configured with respective substantially fixed duty cycle values.

10. The voltage converter system of claim 8, wherein the plurality of controllers configured to determine the adjustable duty cycle behavior for the at least one of the multiple voltage converting cells is configured to derive duty cycle characteristics for the multiple voltage converting cells to achieve a desired output voltage for the voltage converter system that optimizes one or more objective functions.

11. The voltage converter system of claim 10, wherein the one or more objective functions includes one or more of: a) 1-norm objective function of all inductor currents in the voltage converter system to minimize overall current rating of the voltage converter system, b) a 2-norm squared objective function of all the inductor currents of the voltage converter system to minimize overall power loss in the voltage converter system, or c) an inf-norm objective function of all the inductor currents of the voltage converter system to minimize maximum currents levels in all the inductor currents.

12. The voltage converter system of claim 1, wherein at least one of the multiple voltage converting cells comprises a Dual Active Half Bridge (DAHB) converter configuration cell that includes a primary side and a secondary side separated from the primary side by a transformer, with the primary side including one or more primary side energy storage elements and one or more primary side switches, and with the secondary side including one or more secondary side energy storage elements and one or more secondary side switching devices.

13. The voltage converter system of claim 12, wherein the at least one DAHB converter configuration cell includes two primary side capacitors, two primary side controllable switching devices, two secondary side capacitors, and two secondary side switching devices.

14. The voltage converter system of claim 13, wherein the plurality of controllers configured to independently control the voltage levels of the at least one energy storage element of each of the multiple voltage converting cells includes at least one dedicated controller for the at least one DAHB converter configuration cell, the at least one dedicated controller configured to controllably actuate the two primary side switching devices and the two secondary side switching devices according to one or more pre-determined switching sequences defined for a particular time interval.

15. The voltage converter system of claim 14, wherein the one or more switching sequences for the at least one DAHB converter configuration cell is defined by duty cycles for the primary side and for the secondary side, and by a phase shift, $\phi$, between a primary side and a secondary side switching events.

16. The voltage converter system of claim 12, wherein the multiple voltage converting cells each includes a respective cell with the DAHB converter configuration cell, and wherein the multiple voltage converting cells are arranged as one or more stacked cascades of the cells with the DAHB converter configuration cell connected to a load.

17. The voltage converter system of claim 1, wherein the multi-level arrangement of the multiple voltage converting cells comprises a plurality of voltage converting cells arranged in multiple stacks of voltage converting cells connected to a load, and wherein the plurality of controllers comprises a central controller in electrical communication with the multiple stacks of voltage converting cells to control electrical currents produced by the multiple stacks to power the load.

18. The voltage converter system of claim 17, wherein the load comprises a multi-phase motor, with each of the multiple stacks of voltage converter cells providing a respective phased current for one of multi-phase inputs of the multi-phase motors, and wherein the central controller is configured to control duty cycles of one or more switching devices in the multiple stacks to produce the multi-phase currents that result in one or more of a specified motor speed or a specified motor torque.

19. The voltage converter of claim 17, wherein the plurality of controllers comprises an individual cell controller for each of the multiple voltage converting cells, with the each of the multiple voltage converting cells comprising two capacitors, two switching devices, and an inductor element arranged in a buck-boost converter configuration, and wherein the each individual cell controller for the each of the multiple voltage converting cells is configured to maintain a ratio between a first and second voltage levels of non-common terminals of the two capacitors at a specified level.

20. A voltage conversion method comprising:
obtaining electrical properties data representative of electrical properties of a voltage converter system comprising a plurality of energy storage elements and a plurality of switching devices, with each of the plurality of switching devices being electrically coupled to at least one of the plurality of the energy storage elements, wherein the plurality of energy storage elements and the plurality of switching devices are configured in a multi-level arrangement of multiple voltage converting cells; and
controllably actuating by a plurality of controllers coupled to the multiple voltage converting cells, based at least in part on the electrical properties data, one or more of the plurality of the switching devices to independently control voltage levels of at least one energy storage element of the multiple voltage converting cells.

21. The method of claim 20, wherein each of the multiple voltage converting cells comprises an arrangement of two capacitors and an inductor that define a buck-boost converter circuit.

22. The method of claim 20, wherein controllably actuating the one or more of the plurality of switching devices comprises independently controlling the voltage levels of the at least one energy storage element of each of the multiple voltage converting cells to achieve a voltage balance for the multiple voltage converting cells.

23. The method of claim 20, wherein controllably actuating the one or more of the plurality of switching devices comprises controllably actuating the one or more of the plurality of switching devices according to a voltage level measured across at least one of the plurality energy storage elements.

24. The method of claim 20, wherein controllably actuating the one or more of the plurality of switching devices comprises:
determining an adjustable duty cycle behavior for at least one of the multiple voltage converting cells.

25. The method of claim 24, wherein determining the adjustable duty cycle behavior for the at least one of the multiple voltage converting cells comprises continually computing the duty cycle behavior for the at least one of the multiple voltage converting cells that achieves a pre-determined output voltage for the voltage converter system, with other of the multiple voltage converting cells, excluding the at least one of the multiple voltage converting cells, configured with respective substantially fixed duty cycle values.

26. The method of claim 24, wherein determining the adjustable duty cycle behavior for the at least one of the multiple voltage converting cells comprises deriving duty cycle characteristics for the multiple voltage converting cells to achieve a desired output voltage for the voltage converter system that optimizes one or more objective functions.

27. The method of claim 26, wherein the one or more objective functions includes one or more of: a) 1-norm objective function of all inductor currents in the voltage converter system to minimize overall current rating of the voltage converter system, b) a 2-norm squared objective function of all the inductor currents of the voltage converter system to minimize overall power loss in the voltage converter system, or c) an inf-norm objective function of all the inductor currents of the voltage converter system to minimize maximum currents levels in all the inductor currents.

28. The method of claim 20, wherein at least one of the multiple voltage converting cells comprises a Dual Active Half Bridge (DAHB) converter configuration cell that includes a primary side and a secondary side separated from the primary side by a transformer, with the primary side including one or more primary side energy storage elements and one or more primary side switches, and with the secondary side including one or more secondary side energy storage elements and one or more secondary side switching devices.

29. The method of claim 28, wherein the at least one DAHB converter configuration cell includes two primary side capacitors, two primary side controllable switching devices, two secondary side capacitors, and two secondary side switching devices, and wherein controllably actuating the one or more of the plurality of switching devices comprises controllably actuating the two primary side switching devices and the two secondary side switching devices according to one or more pre-determined switching sequences defined for a particular time interval.

30. The method of claim 29, wherein the one or more switching sequences for the at least one DAHB converter configuration cell is defined by duty cycles for the primary side and for the secondary side, and by a phase shift, $\phi$, between a primary side and a secondary side switching events.

31. The method of claim 20, wherein the multi-level arrangement of the multiple voltage converting cells comprises a plurality of voltage converting cells arranged in multiple stacks of voltage converting cells connected to a load, and wherein controllably actuating the one or more of the plurality of the switching devices comprises controlling, by a central controller from the plurality of controllers, electrical currents produced by the multiple stacks to power the load.

32. The method of claim 31, wherein the load comprises a multi-phase motor, with each of the multiple stacks of voltage converter cells providing a respective phased current for one of multi-phase inputs of the multi-phase motors, and wherein controlling, by the central controller, the electrical currents produced by the multiple stacks comprises controlling duty cycles of one or more switching devices in the multiple stacks to produce the multi-phase currents that result in one or more of a specified motor speed or a specified motor torque.

33. The method of claim 31, wherein controllably actuating the one or more of the plurality of switching devices further comprises controlling individually, by a dedicated cell controller for at least one of the multiple voltage converting cells, the at least one of the multiple voltage converting cells that includes two capacitors, two switching devices, and an inductor element arranged in a buck-boost converter configuration, to maintain a ratio between a first and second voltage levels of non-common terminals of the two capacitors at a specified level.

34. The method of claim 20, wherein the multi-level arrangement of the multiple voltage converting cells comprises a plurality of voltage converting cells arranged in multiple stacks of voltage converting cells connected to a load, with each of the multiple voltage converting cell including a dedicated cell controller, and wherein controllably actuating the one or more of the plurality of the switching devices comprises controllably actuating, by the respective dedicated cell controller for the each of the multiple voltage converting cells, the one or more of the plurality of the switching devices to independently control voltage levels of the at least one energy storage element of the multiple voltage converting cells.

35. A non-transitory computer readable media storing a set of instructions, executable on at least one programmable device, to:

obtain electrical properties data representative of electrical properties of a voltage converter system comprising a plurality of energy storage elements and a plurality of switching devices, with each of the plurality of switching devices being in electrical communication with at least one of the plurality of the energy storage elements, wherein the plurality of energy storage elements and the plurality of switching devices are configured in a multi-level arrangement of multiple voltage converting cells; and controllably actuate by a plurality of controllers coupled to the multiple voltage converting cells, based at least in part on the electrical properties data, one or more of the plurality of the switching devices to independently control voltage levels of at least one energy storage element of the multiple voltage converting cells.

\* \* \* \* \*